US010300437B2

(12) United States Patent
Doyen et al.

(10) Patent No.: US 10,300,437 B2
(45) Date of Patent: May 28, 2019

(54) MEMBRANE CARTRIDGE WITH INTEGRATED FUNCTIONS

(71) Applicant: VITO NV (VLAAMSE INSTELLING VOOR TECHNOLOGISCH ONDERZOEK NV), Mol (BE)

(72) Inventors: Willy Doyen, Wommelgem (BE); Bart Molenberghs, Mol (BE)

(73) Assignee: VITO NV (VLAAMSE INSTELLING VOOR TECHNOLOGISCH ONDERZOEK NV), Mol (BE)

(*) Notice: Subject to any disclaimer, the term of this patent is extended or adjusted under 35 U.S.C. 154(b) by 44 days.

(21) Appl. No.: 15/529,447

(22) PCT Filed: Dec. 4, 2015

(86) PCT No.: PCT/EP2015/079648
§ 371 (c)(1),
(2) Date: May 24, 2017

(87) PCT Pub. No.: WO2016/087638
PCT Pub. Date: Jun. 9, 2016

(65) Prior Publication Data
US 2017/0320019 A1 Nov. 9, 2017

(30) Foreign Application Priority Data
Dec. 5, 2014 (EP) .................................... 14196471

(51) Int. Cl.
*B01D 63/08* (2006.01)
*C02F 3/06* (2006.01)
(Continued)

(52) U.S. Cl.
CPC ......... *B01D 63/082* (2013.01); *B01D 63/081* (2013.01); *B01D 67/0009* (2013.01);
(Continued)

(58) Field of Classification Search
CPC .... B01D 63/08; B01D 63/081; B01D 65/003; B01D 69/06; B01D 69/10; B01D 69/12;
(Continued)

(56) References Cited

U.S. PATENT DOCUMENTS 5,482,625 A * 1/1996 Shimizu ................ B01D 61/18
210/231
2005/0000881 A1 1/2005 Bruss
(Continued)

FOREIGN PATENT DOCUMENTS

| EP | 0662341 A1 | 7/1995 |
| EP | 1466658 A1 | 10/2004 |

(Continued)

OTHER PUBLICATIONS

Mar. 24, 2016, International Search Report of the International Searching Authority from the European Patent Office in PCT/EP2015/078648, which is the international application to this U.S. Application.

(Continued)

*Primary Examiner* — Pranav N Patel
(74) *Attorney, Agent, or Firm* — Kolitch Romano LLP

(57) ABSTRACT

Assembly for treating fluids, comprising a support (12) having a first and second oppositely arranged surfaces (121) for backing support of a semi permeable membrane (11), a first fluid conveying compartments (124) interposed between the first and second surfaces, a plurality of first fluid passages (126) extending from the first surface (121) and being in fluid communication with the first compartments (124), and a first duct attached to the support (12) and in fluid communication with the first compartments. The assembly comprises a second compartment (125) arranged for conveying fluid and different from the first compartment, and a second duct attached to the support (12) and config- (Continued)

ured to be in fluid communication with the second compartment (125).

19 Claims, 13 Drawing Sheets

(51) Int. Cl.
*B01D 67/00* (2006.01)
*C02F 3/12* (2006.01)

(52) U.S. Cl.
CPC .......... *C02F 3/1273* (2013.01); *C02F 3/1278* (2013.01); *B01D 2313/10* (2013.01); *B01D 2313/105* (2013.01); *B01D 2313/12* (2013.01); *B01D 2313/146* (2013.01); *B01D 2315/06* (2013.01); *B01D 2321/185* (2013.01); *C02F 2203/006* (2013.01)

(58) Field of Classification Search
CPC ........ B01D 2313/146; B01D 2313/105; B01D 2313/125; B01D 2313/10; B01D 2313/12; B01D 2313/06; B01D 2313/26; B01D 2315/06; B01D 2321/18; B01D 2321/185; C02F 3/1273; C02F 3/1268
See application file for complete search history.

(56) References Cited

U.S. PATENT DOCUMENTS

| | | | |
|---|---|---|---|
| 2005/0123727 A1 | 6/2005 | Hester et al. | |
| 2007/0125697 A1* | 6/2007 | Lee | B01D 63/02 210/321.69 |
| 2010/0258492 A1 | 10/2010 | Kang et al. | |
| 2011/0049038 A1* | 3/2011 | Aerts | B01D 61/18 210/321.75 |

FOREIGN PATENT DOCUMENTS

| | | |
|---|---|---|
| EP | 1366804 B1 | 12/2004 |
| EP | 1543945 B1 | 5/2008 |
| JP | H110263371 A | 10/1998 |
| WO | 03037489 A1 | 5/2003 |
| WO | 2006015461 A1 | 2/2006 |
| WO | 2006091157 A1 | 8/2006 |
| WO | 2013022945 A2 | 2/2013 |
| WO | 2013113928 A1 | 8/2013 |

OTHER PUBLICATIONS

Mar. 24, 2016, Written Opinion of the International Searching Authority from the European Patent Office in PCT/EP2015/078648, which is the international application to this U.S. Application.

* cited by examiner

MEMBRANE CARTRIDGE WITH INTEGRATED FUNCTIONS

CROSS-REFERENCE TO RELATED APPLICATIONS

This application is a national phase application of PCT/EP2015/078648, filed Dec. 4, 2015, which claims priority to European Patent Application No. 14196471.8, filed Dec. 5, 2014, each of which is hereby incorporated by reference.

BACKGROUND OF THE INVENTION

The present invention is related to cartridges comprising a support for attachment of (a) semi-permeable membrane(s) thereto, in which the support comprises an integrated permeate collection channel.

Membrane cartridges of the above kind are known from e.g. WO 2013/113928, WO 2006/091157, EP 0662341, and EP 1366804. These cartridges comprise a rigid planar support structure and one or more filtration layers, usually made of an organic semi-permeable membrane, provided on at least one side and typically on both sides of the support structure. The support structure typically comprises integrated permeate collection channels formed within the structure, between the opposite external surfaces onto which the membrane layers are provided. The integrated permeate collection channels are connected to an outlet port of the cartridge for evacuating permeate (e.g., the filtrate).

The membrane cartridges are e.g. used in filtration modules, in which a large number of cartridges are stacked. Typically, such as in wastewater purification and bioreactors, the filtration modules are completely submerged in the waste water. Air bubbling is provided underneath the stack of filtration cartridges in order to create an upward flow of waste water along the membranes. The air bubbles are also effective in scrubbing the membrane surface thereby removing solids which would tend to adhere to the membrane. Filtration modules of the above kind are described in e.g. WO 03/037489 and EP 0662341.

It has been observed that air bubbling is of critical importance for a correct functioning of the filtration module. It should be ensured that air bubbling is applied as uniformly as possible along all the membrane surfaces of each cartridge, so that each cartridge within the module can function optimally. It is to be further noted that aeration counts for a significant part of the operational cost of filtration apparatuses.

In addition, there is a tendency towards constructing larger bioreactors and filtration apparatuses, and in these large systems it is key to make optimal use of the available volume. Therefore there is a tendency towards increasing the membrane (filtration) surface area per unit volume as much as possible. In this regard, the aerators used underneath the stacks of filtration cartridges take up a fairly large volume which cannot be used for filtration.

BRIEF SUMMARY OF THE INVENTION

It is an object of the invention to provide a more suitable design of membrane cartridges and/or modules, which can respond to the above needs. It is an object of the invention to provide more compact systems with similar or even improved performance compared to prior art systems. It is an object of the invention to provide systems having a lower operational cost.

According to aspects of the invention, there is therefore provided an assembly for treating fluids, i.e. a cartridge assembly, as set out in the appended claims.

According to further aspects of the invention, there is provided a module for treating fluids comprising a stack of the above assemblies, as set out in the appended claims. According to yet a further aspect of the invention, there is provided a biomass reactor comprising at least one of the above modules, as set out in the appended claims.

Assemblies according to aspects of the invention comprise a support for a semi-permeable membrane, wherein the support has a first planar surface and an opposite second surface. At least one first fluid compartment is interposed between the first and second surfaces and advantageously extends from the first surface to the second surface. A second fluid compartment, separate from the first compartment can be interposed between the first and second surfaces, such as to extend from the first surface to the second surface, or is attached or attachable to an edge of the support in such a way that the second compartment is in advantageously vertical alignment with the support. Assemblies comprise a first duct in fluid communication with the at least one first fluid compartment and a second duct in fluid communication with the second fluid compartment. Both the first and second ducts and the first and second fluid compartments are fluid tightly sealed from one another, such as through fluid impermeable separating walls, within the assembly. In other words, the second duct is fluid tightly sealed from the at least one first compartment, and the first duct is fluid tightly sealed from the at least one second compartment within the assembly.

Assemblies according to the invention comprise separate fluid compartments which are integrated within, or attached to, the possibly rigid support of a membrane. These separate fluid compartments are served by separate ducts, allowing the separate compartments to advantageously be used for different functions. The integration of these functions within, or aligned with the support optimizes stacking density and improves uniformity of operation between cartridges throughout the stack. This allows for improving operational performance of the cartridge and the module and/or reduce operational and/or installation costs.

The provision of separate compartments within the support, each being served by a separate duct, additionally enables a whole new range of applications. There is therefore described a use of assemblies and/or modules according to aspects of the invention for dosing chemical compounds to the surrounding fluid through a separate compartment of the support. Dosing can be carried out in addition to permeate extraction through other compartments of the support. The chemical compounds can be antiscalants. A use of assemblies and/or modules according to aspects of the invention for selective removal of compounds, such as inhibiting compounds through a separate compartment of the support is described. Removal can be carried out in addition to permeate extraction through other compartments of the support. The selective removal can be performed by liquid-liquid extraction. The selectively removed compounds can be reaction products of a feed stream, such as ethanol through pervaporation. Separate compartments of the support can each be configured to selectively remove different compounds (e.g. different reaction products) from a feed stream, such as through providing different membranes on different areas of the support.

A membrane panel is also described. The membrane panel comprises an advantageously rigid support and a first semi permeable membrane. The support comprises a first planar surface arranged for backing support of, and forming an interface with, the first semi permeable membrane, and a second surface, which can be planar and on which a second semi permeable membrane can be attached. The first and second surfaces are arranged oppositely one another. The membrane panel comprises a plurality of compartments interposed between the first and second surfaces, the compartments being arranged for conveying fluid. The membrane panel comprises a plurality of first fluid passages extending from the first surface and being in fluid communication with at least one of the compartments and with the first semi-permeable membrane, the at least one of the compartments forming a first set of the compartments. The first semi-permeable membrane extends over a membrane area on the first surface and covers the first fluid passages. The membrane panel comprises second fluid passages extending between one or more compartments of a second set of the compartments, separate from the first set, and the first surface, and are in fluid communication with the one or more compartments of the second set. The second fluid passages are located in a second area of the first surface which is separate from the membrane area. The second area can be free of covering by a membrane, advantageously extends along one edge of the first semi permeable membrane, and is advantageously located below the membrane area. The compartments of the first set and the compartments of the second set are fluid tightly sealed from one another. The membrane panel is advantageously used in assemblies according to aspects of the invention.

BRIEF DESCRIPTION OF THE DRAWINGS

Aspects of the invention will now be described in more detail with reference to the appended drawings, which are illustrative, and wherein same reference numerals illustrate same features, wherein.

DETAILED DESCRIPTION OF THE INVENTION

A membrane cartridge refers to an assembly comprising: (i) a planar backing support for a semi permeable membrane, wherein one or more fluid conveying compartments are integrated within the support, (ii) one or more fluid ports arranged in fluid communication with the compartments, for evacuating and/or feeding the fluid from/to the compartments, and, optionally, (iii) the semi permeable membrane attached at one side or opposite sides of the support. Fluid distribution manifolds can be provided between the fluid ports and the fluid compartments. Throughout the description, hence, the notion of cartridge may or may not imply the presence of the semi permeable membrane. It follows that a membrane cartridge can refer both to an intermediate assembly product (without any membrane layer), and to the final product.

Figure 7:
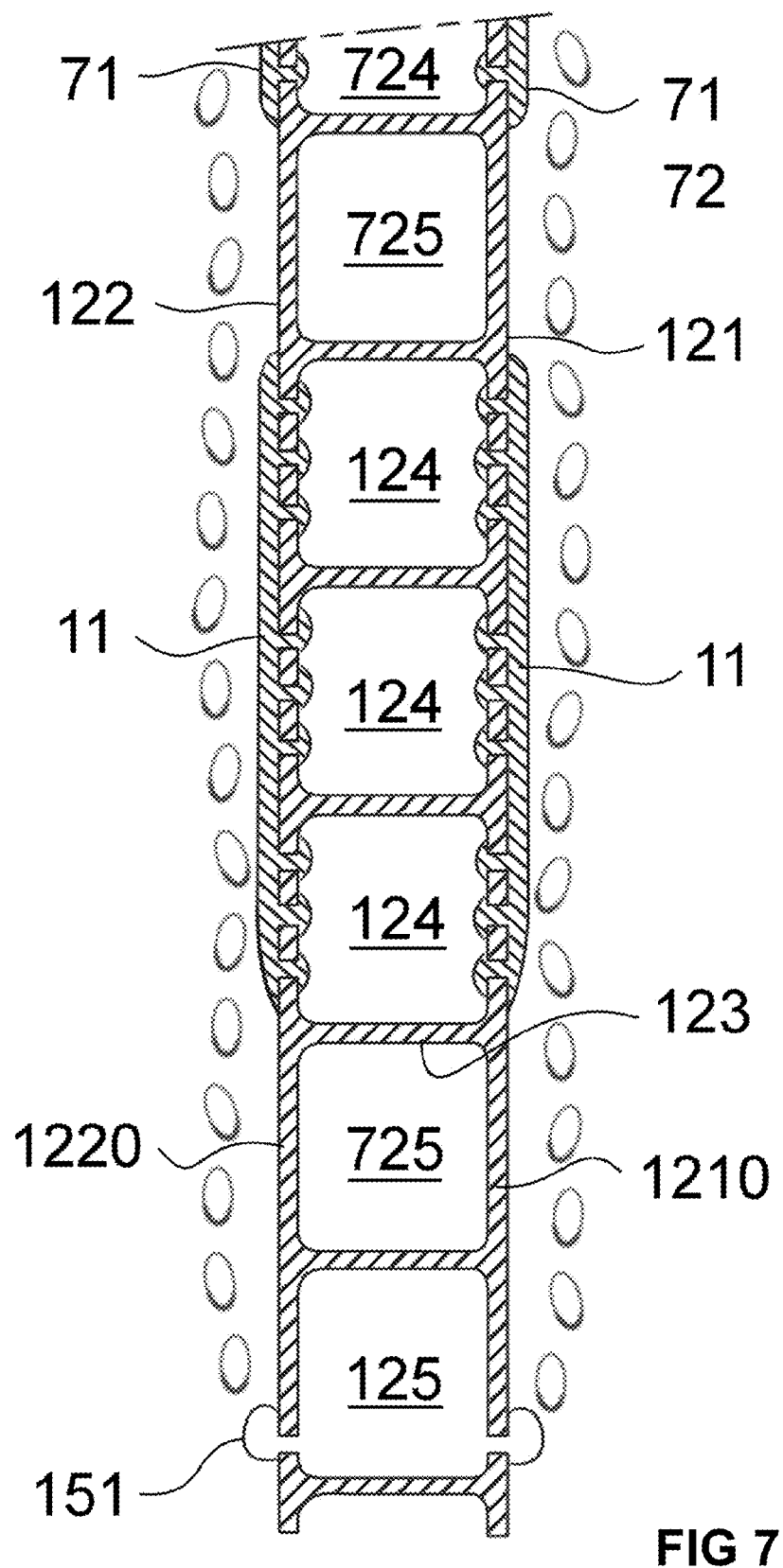
FIG. 7 represents a partial cross sectional view of a support and membranes according to another embodiment of the invention.

A fluid compartment refers to a void volume or chamber which is in fluid communication with one or more of the fluid ports of the cartridge assembly. The fluid compartment can be arranged integrally within the support (as will e.g. be shown in relation to FIGS. 7 and 8), or can be attached to the support, advantageously in alignment with the support (as will be shown in relation to FIG. 11).

A module refers to a stack of membrane cartridges. The membrane cartridges in a module have all a semi permeable membrane layer attached on their support.

A web as used in the present description refers to an integral or separate part of the support, which forms a continuous, flat, narrow, rigid connection between two oppositely arranged, spaced apart and advantageously parallel walls of the support.

A membrane as referred to in the present description refers to a semi-permeable membrane, being a layer or sheet of a solid, continuous and advantageously porous material having a structure allowing one or more compounds to be selectively transported through the membrane and hence enabling to separate the one or more compounds from a feed, which can be liquid or gaseous. A membrane hence features a determined permeability for the one or more compounds. The permselectivity can be determined by all kinds of separation mechanisms, such as but not limited to a characteristic pore size of the membrane (e.g. microporous or nanoporous filtration membranes), by a characteristic attraction of specific charge types (e.g. an ion exchange membrane), selective sorption, or solution diffusion characteristics.

The membranes as referred to in the present description are advantageously configured for separation of compounds by microfiltration, ultrafiltration, nanofiltration, reverse osmosis, forward osmosis, pressure retarded osmosis, membrane bioreactors, pervaporation, membrane distillation, supported liquid membranes, pertraction, membrane absorbers, enzyme reactors, membrane contactors, (reverse) electrodialysis, or gas separation. The membranes can be configured as ion exchange membranes.

The membranes as referred to in the present description are membranes advantageously obtained by subjecting a polymer solution to a phase separation process. Phase separation, which is also referred to as phase inversion, is a well-known process wherein demixing between the polymer and the solvent is induced. As a result of demixing, the polymer precipitates, thereby forming a membrane lattice with a desired structure (pore size, pore structure, etc.). Further process steps can be carried out in order to remove the solvent completely (e.g., washing) and to obtain a final pore structure (e.g., removing pore formers). Demixing can be induced based on several techniques. One possibility is thermally induced phase separation (TIPS), wherein demixing is induced by a temperature change at the interface of the polymer solution. Another possibility is to induce a chemical reaction in the polymer solution, causing demixing. This is referred to as reaction induced phase separation (RIPS). However, in the vast majority of cases, demixing is induced by phase diffusion. The polymer solution is contacted with another phase, being a liquid (liquid induced phase separation or LIPS), or a gas (vapour, referred to as vapour induced phase separation or VIPS), which is a non-solvent of the polymer but which is miscible with the solvent of the polymer solution. The liquid or vapour will diffuse through the polymer solution and cause a local change in the polymer solution composition, inducing demixing. As a result, the polymer precipitates from the solution. LIPS is also referred to as immersion precipitation. It will be convenient to note that any phase separation process can be applied to prepare the membranes as described herein.

The membrane comprises or consists of an advantageously thermoplastic polymer compound, which will be referred to hereinafter as the first polymer compound. The first polymer compound is the principal or primary polymeric compound used for preparing the membrane forming solution, e.g. the polymer compound present in largest amount in the membrane forming solution. The first polymer compound can be polysulfone (PSU), polyethersulfone (PESU), a grafted variant of them, or a copolymer of either one of the polymers. The first polymer compound can be polyvinylidene fluoride (PVDF), polyvinylidene chloride (PVDC), a grafted variant of them, or a copolymer of either one of the polymers. The first polymer compound can be polyvinyl chloride (PVC), chlorinated polyvinyl chloride (CPVC), a grafted variant of them, or a copolymer of either one of the polymers. The first polymer compound can be a polymer of the polyaryletherketone (PAEK) family, such as polyether ether ketone (PEEK), a grafted variant of any of these polymers, such as sulfonated polyether ether ketone (PEEK-WC), or a copolymer of any one of these polymers. The first polymer compound can be polychlorotrifluoroethene (PCTFE), polyether imide (PEI), polyimide (PI), polyamide imide (PAI), polyacrylonitrile (PAN), polyurethane (PUR), in particular a thermoplastic polyurethane, a grafted variant of any of these polymers, or a copolymer of any one of these polymers. The first polymer compound can be polyphenylene sulphide (PPS), cellulose acetate (CA), cellulose triacetate (CTA), a grafted variant of any of these polymers, or a copolymer of any of these polymers. The copolymers as indicated above can be suitable copolymers of the indicated polymer with any one of polyvinyl chloride, polymethyl methacrylate (PMMA), polycarbonate (PC), cyanoacrylate, cellulose triacetate, polyphenylene sulphide, polystyrene (PS), polyvinyl alcohol (PVA), polyvinyl acetate (PVAc), and polyamides such as polycaprolactam (nylon 6) and nylon-6,6. The first polymer compound can be a suitable blend of two or more of the above listed polymers.

The amount of first polymer compound in the (dry) (final) membrane can be at least 5% by weight, up to at least 50% by weight. The first polymer compound can be an organic binder forming a matrix or lattice of the membrane, in which a possibly hydrophilic filler material is optionally dispersed. The filler material may be organic and is advantageously one or a combination of: hydroxypropylcellulose (HPC), carboxymethylcellulose (CMC), polyvinyl pyrrolidone (PVP), cross-linked polyvinyl pyrrolidone (PVPP), polyvinyl alcohol, polyvinyl acetate, polyethylene oxide (PEO), polyethylene glycol (PEG), and glycerol. Such filler materials can be provided as pore formers and can be removed in a post treatment step, such as by washing in a bleach solution (e.g. for PVP). Other filler materials, which remain in the final membrane layer can be an amine, such as but not limited to one or a combination of: monoethanolamine (MEA), diethanolamine (DEA), polyethylenimine (PEI), am inopropyl-trimethoxysilane and polyethylenimine-trimethoxysilane. The filler material can be an amide or amine containing polymer, such as but not limited to one or a combination of: polyamide (PA), polyurethane (PUR), polyvinylamine (PVAm) and melamine. The filler material may be inorganic, such as one or a combination of $TiO_2$, $HfO_2$, $Al_2O_3$, $ZrO_2$, $Zr_3(PO_4)_4$, $Y_2O_3$, $SiO_2$, carbon, possibly on Pt, Ru or Rh support, $BaSO_4$, $BaTiO_3$, perovskite oxide powder materials, zeolites, metal-organic frameworks (MOF) and silicon carbides. Functionalized variants of the filler materials (such as aminated, sulfonated, acrylated) can be used. Combinations of the above organic and inorganic materials can be used as well as filler material.

Aspects of the invention are related to assemblies which lead to the manufacture of membrane cartridges, in particular so called flat sheet membrane cartridges. Assemblies according to the invention integrate multiple functionalities in the assembly, hence, in a single cartridge. One such functionality can be permeate collection and extraction, which is known. An additional functionality can be air bubbling. Another additional functionality can be collection and extraction of a second, different permeate within the same cartridge. Yet another additional functionality can be gas diffusion. These and other functionalities can be integrated in the assembly and the cartridge, without significantly increasing the size of the cartridge, hence leading to more compact modules. Such additional functionalities also allow for obtaining more uniform control of operational conditions throughout the stack, so that the operation of each single cartridge within the stack can be improved, leading to increased performance.

Figure 1:
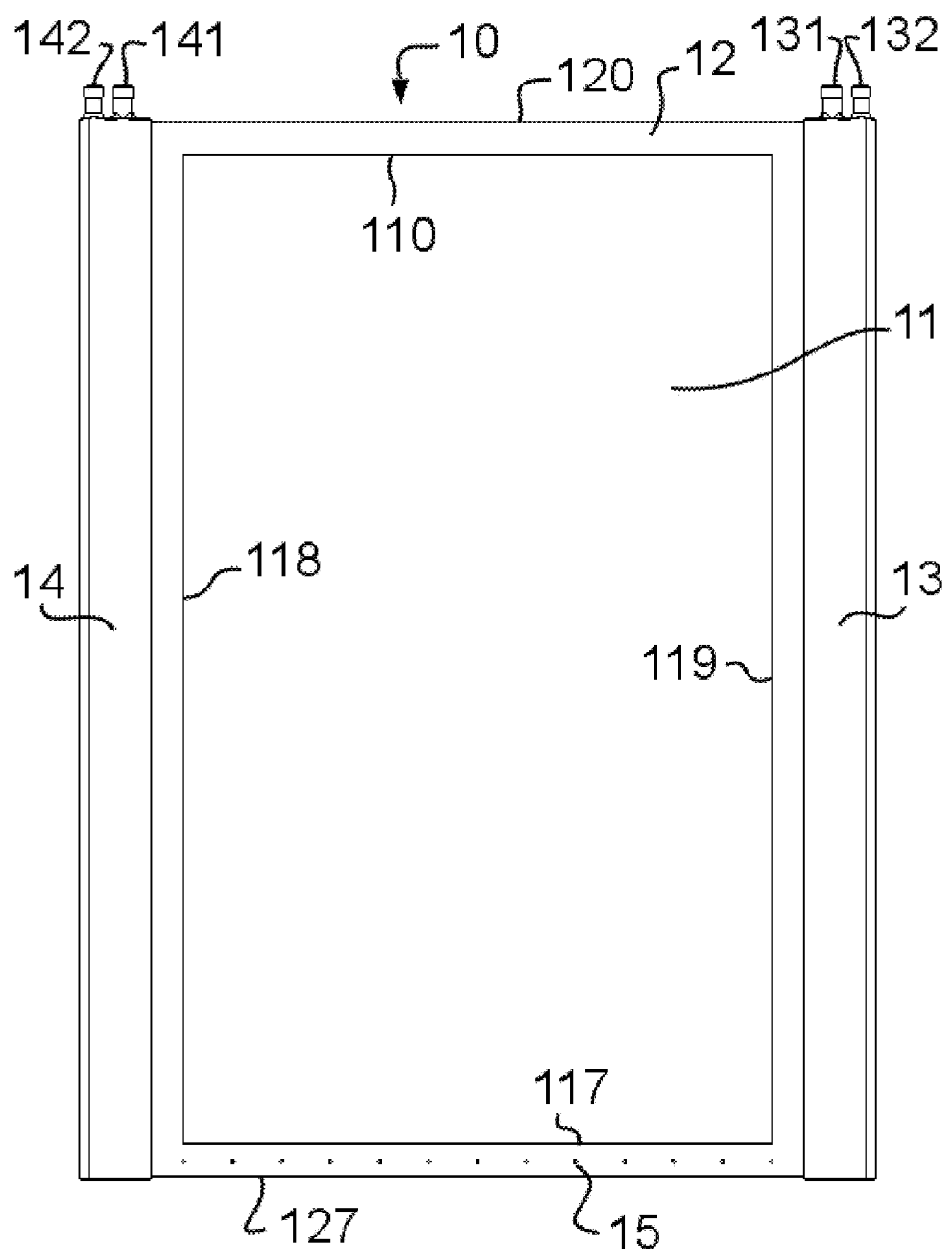
FIG. 1 represents a front plan view of a filtration cartridge according to the invention.

A membrane cartridge according to aspects of the invention is shown in FIG. 1. Cartridge 10 integrates two different functionalities. A first one is collection and extraction of permeate drawn through a semi-permeable membrane 11. The permeate is collected inside a support structure 12 for the membrane 11, as will be described further. The permeate so collected is extracted through outlet ports 131 and 141 as is known in the art. A second functionality of cartridge 10 is air bubbling. To this end, the support 12 is provided at its lower edge with holes 15 for diffusing air from the cartridge into the fluid surrounding cartridge 10. Holes 15 are in fluid communication with air inlet ports 132, 142 provided adjacent the permeate extraction ports 131, 141. Manifolds 13, 14 attached to the support 12 at either side thereof arrange for conveying permeate from inside the support 12 to the outlet ports 131, 141 and for conveying air from the inlet ports 132, 142 to the holes 15.

Figure 2:
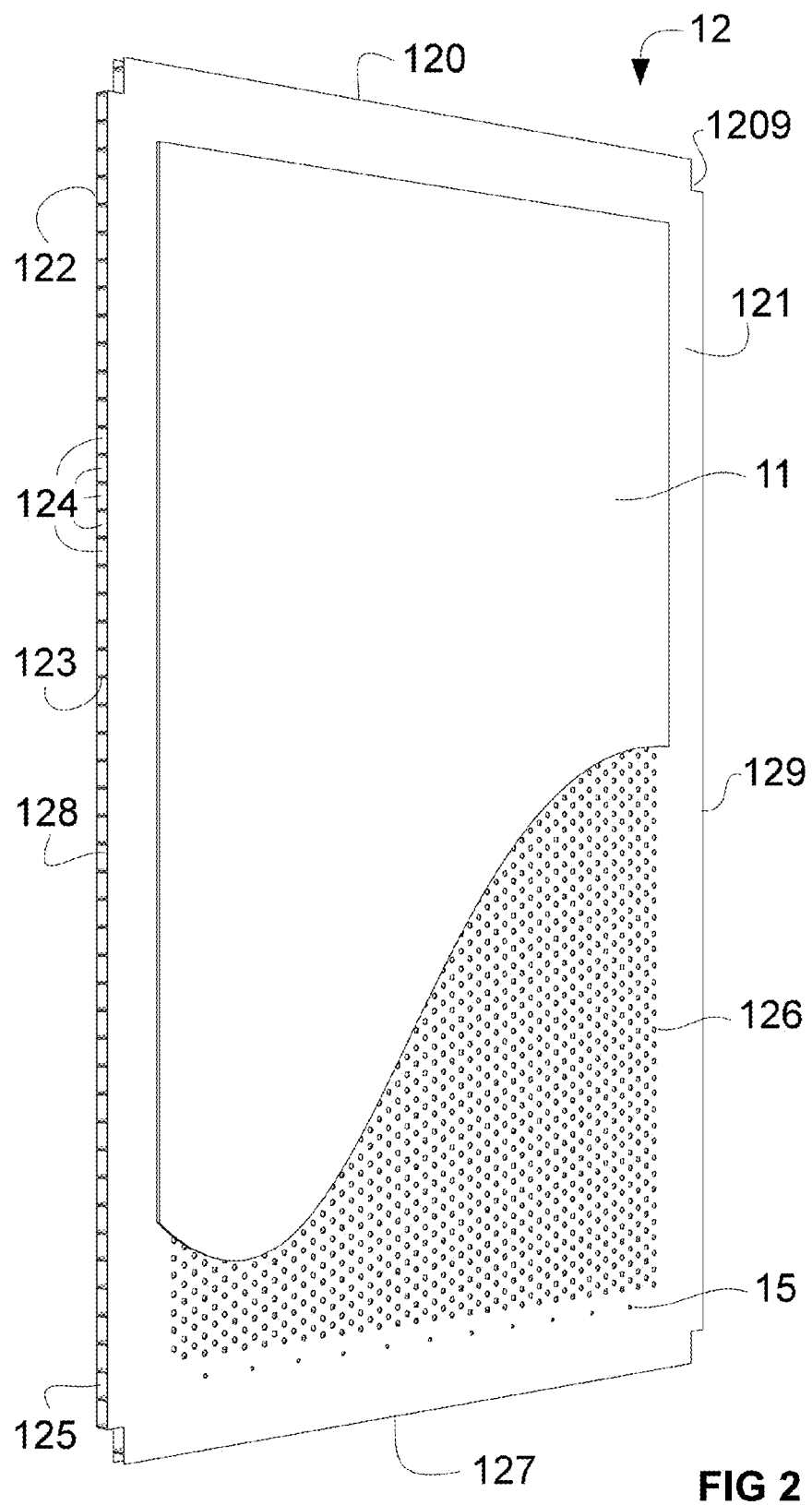
FIG. 2 represents a perspective view of the support and membrane layer—together forming a membrane panel—of the cartridge of FIG. 1, with partial cut out of the membrane.
Figure 3:
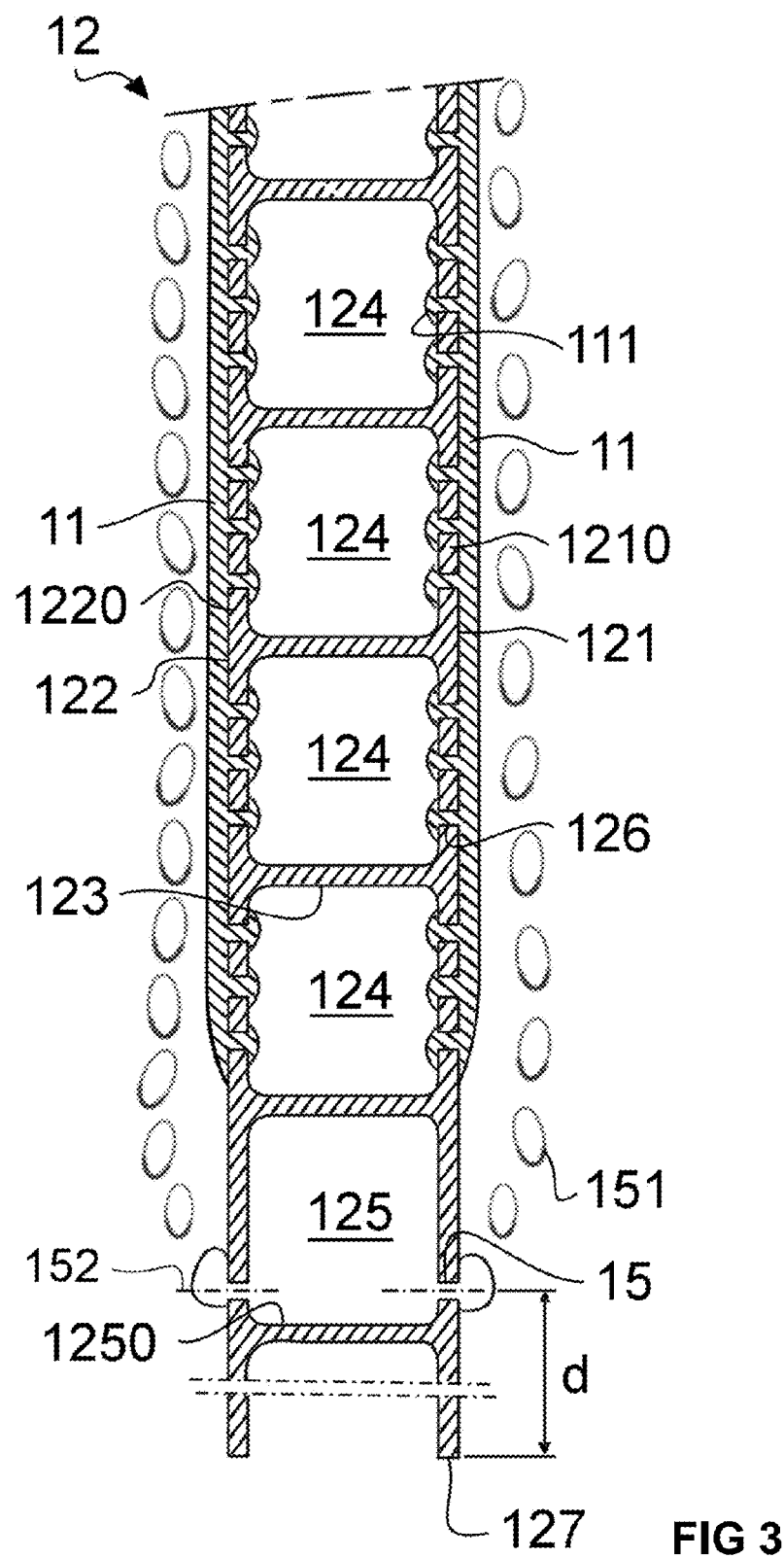
FIG. 3 represents a partial cross sectional view of FIG. 2's support.

Referring to FIGS. 2 and 3, the support 12, which is advantageously flat or planar, and is advantageously formed as a panel or board, comprises a first surface 121 forming a front face of the support. A second surface 122, extending advantageously parallel to the first surface 121, is provided at the opposite side, forming a back face of support 12. The support 12, and hence the first and second surfaces 121, 122, extend between and are delimited by a top edge 120 and a bottom edge 127, and a left side edge 128 and a right side edge 129. The first surface 121 is the outer surface of an outer wall 1210 or layer of the support, and the second surface 122 is the outer surface of an opposite outer wall 1220 or layer, the opposite outer walls 1210 and 1220 being advantageously parallel to each other. The membrane 11 is provided on the first surface 121. In FIG. 3, it can be seen that, optionally, a same membrane 11 can be provided on the second surface 122 as well. Alternatively, a different membrane (different from the membrane on the first surface) can be provided on the second surface 122. The outer walls provide for backing support for the membranes 11.

The first and second surfaces 121 and 122 (i.e., the opposite outer walls) are spaced apart by spacing members 123, which advantageously secure the outer walls and surfaces 121, 122 to each other. Each spacing member 123 advantageously forms a web between the outer walls 1210 and 1220. The web advantageously extends continuously along a line on the surface 121 (and 122). Advantageously, spacing members 123 run continuously from one side edge 128 to the opposite side edge 129 as shown in FIG. 2. Other suitable spacer members may be shaped as pillars, nubs, pleated sheets, corrugated sheets, etc.

The support 12, with outer walls 1210 and 1220 and web members 123 is advantageously rigid. It can have a flexural modulus of at least 150 MPa, advantageously at least 250 MPa, advantageously at least 350 MPa, advantageously at least 500 MPa, advantageously at least 700 MPa, advantageously at least 900 MPa. The flexural modulus can be smaller than or equal to 5000 MPa, advantageously smaller than or equal to 50 GPa, advantageously smaller than or equal to 100 GPa.

Indicated values of flexural modulus can be determined based on ISO standard 178 and based on a specimen which is 80 mm long and 10 mm wide with the thickness of the specimen spanning the total thickness of the support structure in a direction perpendicular to the outer surfaces, and the length of the specimens being all oriented along an axis parallel to a plane of the outer surfaces and having the highest resistance to bending. The test bench should be configured such that the span L according to ISO 178 measures 70 mm and a speed of 5 mm/min should be used.

An important aspect of the invention, is that support 12 is provided with at least two separate fluid compartments. The two separate compartments are advantageously interposed between the first and second surfaces 121 and 122. Advantageously, one or more of the spacing members 123 form a separating wall for the fluid compartments. Referring to FIGS. 2 and 3, spacing members 123 are themselves spaced apart to provide a plurality of (at least two) fluid compartments 124, 125 between the first and second surfaces 121, 122. Such a structure can e.g. be obtained by multi-walled boards or panels. Support structures of the above kind may be made by extrusion, by laminating, by moulding or casting, by additive manufacturing or by any other available technique. Suitable structures for the support 12 are e.g. double or multi-walled polycarbonate sheets, such as Makrolon® multi UV sheets (Bayer, Germany). Other suitable examples are POLISNAKE® polycarbonate panels (Politec Polimeri Tecnici SA, Switzerland) described in EP 1543945, and polypropylene KIBO X-panels and KIBO M-panels (KIBO Kunststoffe GmbH, Germany). Laminated panels, such as tri-laminates made by lamination of two sheets to double side ribbed sheet, or such as bi-laminates (two laminated ribbed sheets), can be suitable as well.

A first set of fluid compartments 124 can be arranged for collecting permeate which is drawn through membranes 11. To this end, and referring to FIG. 2, the first and second surfaces are made permeable for the permeate at selective locations on the first and second surfaces. Permeability of the first and second surfaces can e.g. be obtained by providing through-holes 126, such as perforations, though the outer walls 1210, 1220. It will be convenient to note that the outer walls 1210, 1220 can suitably be made of a dense or impermeable material layer (impermeable for the permeate), with the through-holes 126 provided though this material layer.

The dimensions of the through-holes are not particularly limited and suitable dimensions depend on the application. The through-holes advantageously have a size smaller than or equal to 2 mm, advantageously smaller than or equal to 1.5 mm, advantageously smaller than or equal to 1.2 mm, advantageously smaller than or equal to 1.0 mm. When the holes are too large, smooth coating may be problematic. The through-holes can have a size of at least 5 µm, advantageously at least 10 µm, advantageously at least 25 µm, advantageously at least 50 µm, advantageously at least 100 µm.

The through-holes can be such that the outer surface 122 of the support advantageously exhibits an open area (porosity due to the through-holes) of at least 2%, advantageously at least 5%, advantageously at least 10%, advantageously at least 15%, advantageously at least 20%, advantageously at least 25%, advantageously at least 30%, advantageously at least 35%. The open area is advantageously at most 70%, advantageously at most 60%, advantageously at most 55%, advantageously at most 50%. The open area refers to the area of the through-holes per unit total area of the outer surface (including the through-holes), expressed in percentage values. In defining the total area of the outer surface, any edge region of the membrane element where the membrane layer is sealed fluid-tightly, is disregarded. The open area should advantageously be not too low to provide for sufficient flux through the support outer layers on the one hand, but neither too high in order not to compromise the stiffness of the support structure on the other. It will be convenient to note that the complement of the open area (i.e. 100%—open area) refers to the interfacial surface between membrane and support, which is the area that is available for bonding. Hence also in this regard, the open area should not be too high.

There is no restriction on the cross-sectional shape of the through-holes, i.e. they may be circular, square, polygonal, star-shaped or slit-shaped holes, or holes of any other suitable shape.

The first set of fluid compartments 124 suitably extend underneath an area of the first and second surfaces 121, 122 which is provided with through-holes 126. Logically, this corresponds to the area covered by membrane 11 and is referred to as membrane area.

As shown in FIG. 3, the membranes 11 can form plugs 111 extending in the through-holes 126 creating mechanical anchoring points as described in WO 2013/113928. In addition, or alternatively, the membrane 11 can be attached to the first or second surface by solvent bonding, such as described in WO 2015/140355 24 Sep. 2015, by welding, or by any other suitable bonding technique.

A second fluid compartment 125 can be located below the membrane area in support 12. In the example of FIGS. 1-3, fluid compartment 125 is in fluid communication with holes 15 arranged through the outer walls 1210 and 1220 for conveying air to holes 15. The air is expelled through holes 15 to the outside to form air bubbles 151, e.g. in the waste water in which the cartridge 10 is immersed. The air bubbles 151 rise along the membrane 11. By so doing, the air bubbles 151 entail an upward flow of the waste water along the membranes 11. Additionally, the air bubbles 151 provide for an air scrub of the membrane surface removing solid particles which adhere to the surface of the membranes. As holes 15 are provided through the outer walls 1210 and 1210, it will be appreciated that the holes 15 have axes 152 oriented perpendicular to the first (and second) surface 121 (and 122).

Integration of the second fluid compartment 125 to/in the support 12 ensures that air bubbling is uniformly provided for each membrane surface of the cartridge, and, by extrapolation, for each membrane surface of the stack. Additionally, the second compartment 125 and the holes 15 allow for integrating an aerator directly in the cartridge 10, which leads to a more compact arrangement.

Advantageously, the through-holes 15 are arranged a distance d above the bottom edge 127 of the support to ensure that each bubble exiting hole 15 on the first surface rises along the first surface 121, preventing any air bubble flipping to the second surface 122 and vice versa. This might happen when e.g. the cartridge 10 is not in a correct vertical position. The distance d between the bottom edge 127 of support 12 and the centre of the hole 15 is advantageously at least 5 mm, advantageously at least 10 mm, advantageously at least 15 mm.

It can also be seen on FIG. 3 that the through-holes 15 are advantageously arranged as close as possible to the bottom 1250 of the second fluid compartment 125 in order to avoid a stagnant zone of waste water at the bottom 1250. Advantageously, holes 15 are arranged in the bottom half of the second fluid compartment's height. Advantageously, holes 15 are arranged within the bottommost one third of the second fluid compartment's height.

It will be convenient to note that more than one second fluid compartment 125 can be provided as desired.

The total thickness of the support panel 12, from one outer surface 121 to the opposite outer surface 122 is advantageously 100 mm or less, advantageously 50 mm or less, advantageously 25 mm or less, advantageously 20 mm or less, advantageously 15 mm or less, advantageously 10 mm or less, advantageously 6 mm or less. The total thickness can be at least 200 µm, possibly at least 500 µm, possibly at least 1 mm, possibly at least 1.2 mm, possibly at least 1.5 mm.

Figure 4:
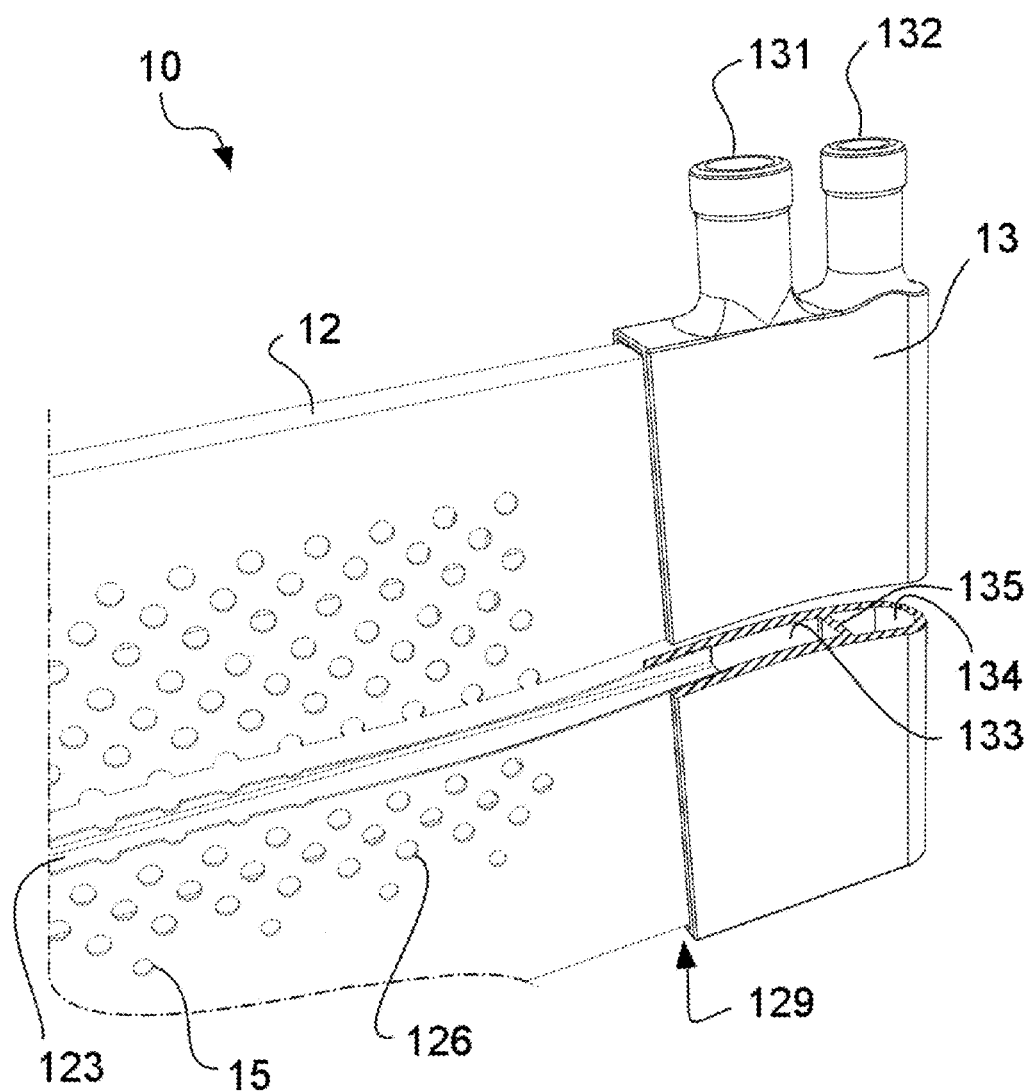
FIG. 4 represents a perspective view of a right hand end of the cartridge of FIG. 1 with the membrane removed and with a partial cut out to reveal inner parts of the manifold and the support.

Advantageously, one or more manifolds attached to the support 12 provide for the evacuation of permeate from the first fluid compartments 124. The same one or more manifolds, or separate one or more manifolds attached to the support can provide for the supply of air to the second fluid compartment(s) 125. Referring to FIG. 4, manifold 13 is attached to the right side edge 129 of support 12. Manifold 13 advantageously comprises two separate ducts extending parallel to the side edge 129, and hence parallel to each other. A first duct 133 is a permeate collector duct which is in fluid communication with the first set of fluid compartments 124. The collector duct 133 evacuates the permeate collected in the first set of fluid compartments 124 to the outlet port 131. A second duct 134 is an air supply duct which is in fluid communication with the second fluid compartment 125 for supplying air thereto. Air is externally fed to the air supply duct 134 through inlet port 132. Collector duct 133 and air supply duct 134 are fluid tightly sealed from one another by separating wall 135.

Figure 5:
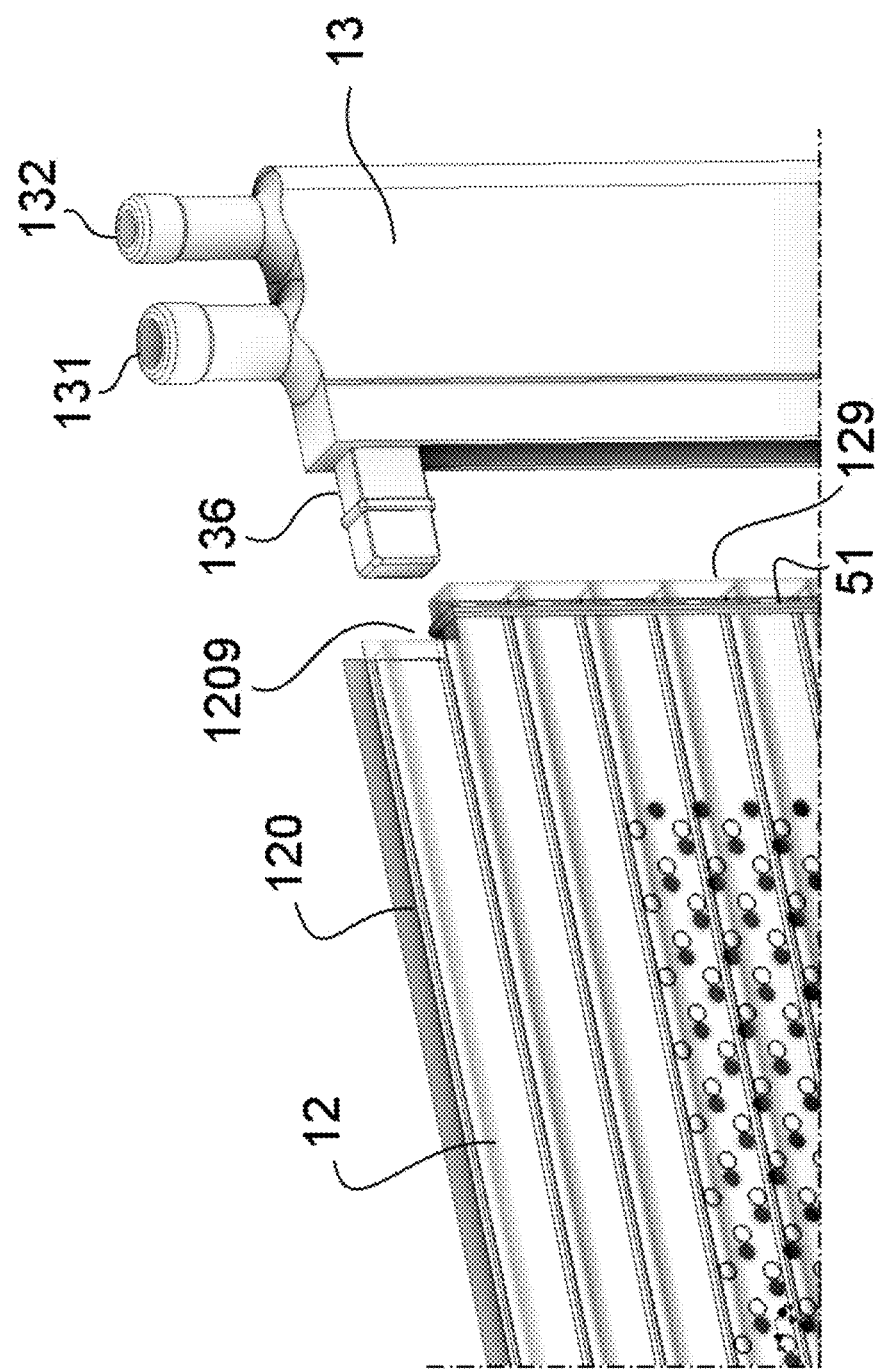
FIG. 5 represents an exploded detail view of FIG. 4.
Figures 6A, 6B:
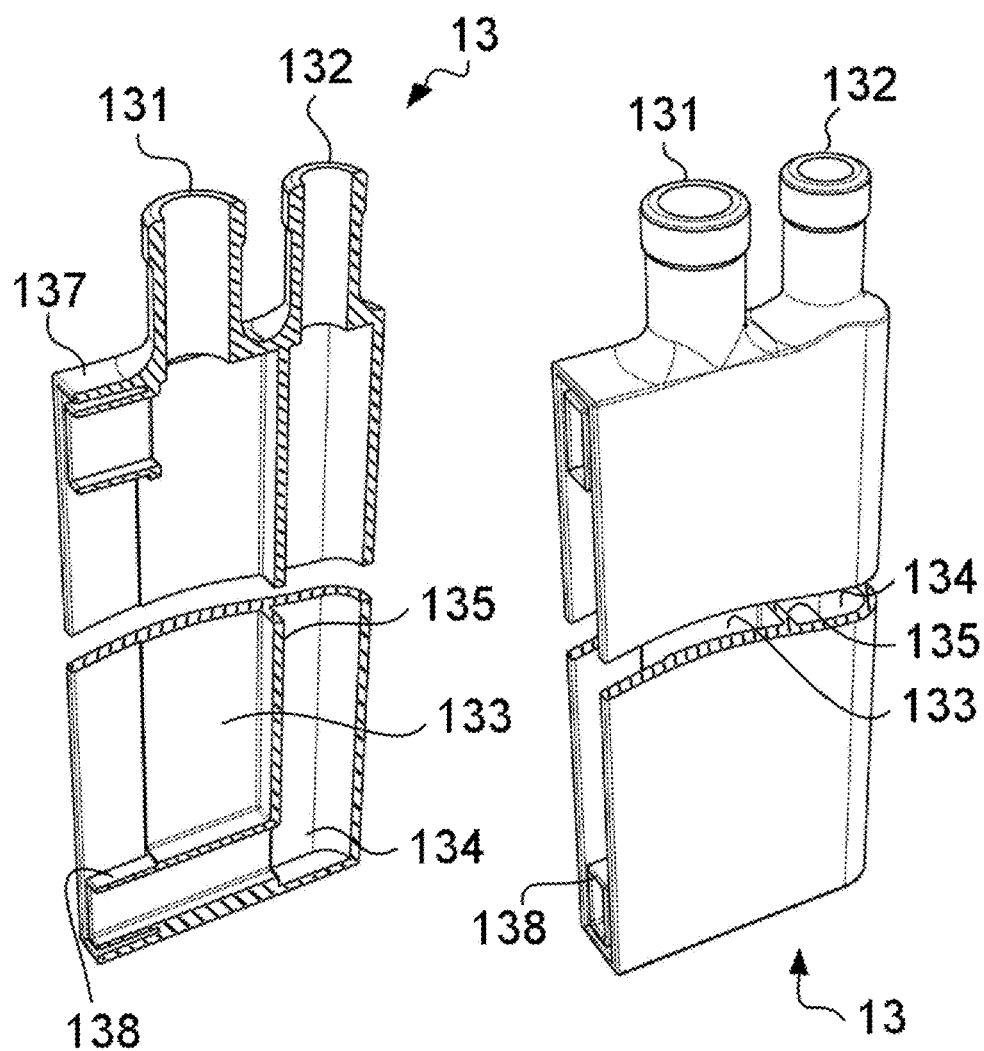
FIG. 6A represents a perspective cross sectional view of a manifold for use in cartridges according to of the invention.
FIG. 6B represents a perspective view of the manifold of FIG. 6A.

To ensure correct assembly of manifold 13 to support 12, one or more index features can be provided on the support 12 and/or on the manifold 13. Index features can e.g. be formed by an indexing boss 136 on manifold 13 co-operating with a corresponding cut out 1209 of the support 12 as shown in FIG. 5. Alternatively, cut out 1209 can be dispensed with, and the indexing boss can be replaced by a sealing manifold wall 137 as shown in FIGS. 6A-B. Manifold wall 137 has a closed perimeter forming a slit which is arranged to fittingly receive the support 12 at its side edge 129.

Sealing between the support 12 and the manifold 13 can be provided according to known techniques. By way of example, and referring to FIG. 5, an elastomeric sealing ring 51 can be provided on the first and second surfaces 121, 122, parallel to the side edge 129 to seal the permeate collector duct 133 of manifold 13 from the surrounding waste water. Sealing ring 51 can e.g. be formed by overmoulding on the support 12. Alternative sealing techniques, such as by gluing, fitting engagement, etc. may be used for attaching the manifold to the support. In this regard, it will be convenient to note that the manifold can be detachable from the support by an appropriate sealing, such as sealing ring 51, even though this is no requirement. Alternatively, the manifold 13, or parts of it, can be directly injection moulded on the side edge 129, such as by overmoulding on the support.

Advantageously, as shown in FIG. 6A, a spout 138 provided at an end of the air supply duct 134 is arranged for fitting engagement with the second fluid compartment 125. Spout 138 can e.g. have a conical outer surface for sealing the transition between air supply duct 134 and second fluid compartment 125, and hence sealing the air circuit from the permeate circuit.

As an advantage, the seal between the manifold 13 and the support 12 is provided outside the membrane area. As the membrane is not involved in the seal between support and manifold, the manifold and the support can advantageously be made detachable. The membrane area, i.e. the area covered with the membrane layer is hence advantageously spaced apart from one or more edges 120, 127, 128, 129 of the support.

Manifold 13 advantageously comprises ducts serving all separate fluid compartments 124 and 125 of the support, and in principle, no additional manifold 14 would be required at the opposite side edge 128 of the support. A second manifold 14, which can be identical to the manifold 13, can however be attached to the opposite side edge 128 of support 12 to provide additional advantages. Firstly, having manifolds at both sides can allow for increasing the fluid fluxes, which in turn can allow for increasing the size of the cartridge. Secondly, having identical manifolds at both sides allows for obtaining completely symmetrical cartridges, which facilitates stack assembly. Alternatively, it is possible to provide one manifold, e.g. manifold 13, with a permeate collection duct only, without any air supply duct, and to provide a separate manifold at the opposite side of the support 12 comprising the air supply duct. Any other combination of arrangements are possible.

As an advantage, manifolds 13 can be made just slightly thicker than the membrane support 12, so that the cartridges can be stacked without affecting stack density negatively.

From the above, it becomes clear that the filtration cartridge of FIG. 1 comprises a support 12 having internal spacing members (not shown in FIG. 1) running horizontally, from the left hand side edge 128 to the right hand side edge 129 of the support. A membrane 11 is provided on the front and back faces of the support (surfaces 121 and 122). The area of the membrane 11 defines the membrane area. That is, the fluid compartments of the support 12 which at least partially overlap with the membrane 11 can (and generally will) be used as permeate collection compartments 124. The area of membrane 11 advantageously extends between a top edge 110, bottom edge 117, right hand side edge 119 and left hand side edge 118. At least the side edges 119, 118, and possibly the top and bottom edges 110, 117 as well, are advantageously spaced apart from the corresponding edges 129, 128, 120, 127 of the support 12 to ease the assembly/attachment of the manifolds 13, 14 to the support 12. The membrane's edges can be spaced apart from the manifolds 13, 14 as well.

It will be convenient to note that at the edges 110, 117, 118, 119 of the membrane, the support surface 121 is dense and does not show permeability for the permeate. In other words, the area of membrane 11 should completely overlap the area over which through-holes 126 extend. Suitable sealing between the support surface 121 and the membrane 11 should be provided at the membrane edges, such as by bonding, e.g. solvent bonding of the membrane layer to the support, welding or gluing.

The cartridge 10 of FIG. 1 is configured for vertical placement in a feed, so that the manifold ducts run vertically and the aeration holes 15 form a horizontal array arranged adjacent the bottom edge 127 of the support. Advantageously, the inlet/outlet ports 131, 132 and 141, 142 of the manifolds 13, 14 are provided at the top, advantageously projecting vertically from the top edge 120 of the support 12.

It will be convenient to note that it is alternatively possible to rotate the cartridge of FIG. 1 by 90° in the plane of the figure. In such a case, manifold 13 would be arranged at the top, whereas manifold 14 would be arranged at the bottom of the cartridge. In such a case, the aeration holes 15 would be provided in the air duct of manifold 14, instead of compartment 125. Compartment 125 would then be used for conveying air from the inlet port 132 of manifold 13 to the air duct of manifold 14 and holes 15, understanding that ports 141 and 142 would be eliminated. This is made possible through the provision of continuous spacing members 123, extending from one edge to the opposite edge of the support. Such a cartridge is contemplated as well by aspects of the present invention, and provides same advantages.

The provision of an integrated aeration/air bubbling system is not the only additional integrated functionality which is rendered possible by the present invention. Separate fluid compartments can be used for other purposes in addition, or alternatively to air bubbling. By way of example, and referring to FIG. 7, support 72 has a plurality of separate membrane areas, defined by separate membranes 11, 71. Membranes 11, 71 cover separate areas of the first and second surfaces 121, 122. These areas are furthermore spaced apart. Membranes 11 are in fluid communication with the first set of fluid compartments 124. Membranes 71 are in fluid communication with a third set of fluid compartments 724. Membranes 11 and 71 can be identical membranes, in which case the fluid compartments 124 and 724 can be fluidly connected to a same permeate collector duct 133 of the manifold.

Alternatively, membranes 11 and 71 can be different, e.g. they can be arranged for separating different compounds from a feed stream, in which case the manifold can have separate permeate collector ducts for compartments 124 and 724, allowing for separately extracting different permeates. By way of example, membrane 11 can be a hydrophilic semi permeable membrane for liquid extraction from a feed stream. Membrane 71 can be a hydrophobic semi permeable membrane acting as a gas diffusion layer for gas extraction from, or gas injection in the feed stream. The gas diffusion layer could e.g. be used for dissolving a gas in the feed stream in the proximity of the liquid extraction membrane layer 11. The dissolved gas could e.g. induce or enhance a number of chemical reactions beneficial for permeate extraction. Alternatively, chemical compounds, such as antiscalants, either in gas or liquid form, can be dosed to the surrounding liquid by injection from compartment 724, through membrane 71. In a yet additional alternative, membrane 71 and compartment 724 can be used for selective removal of possibly inhibiting compounds, e.g. by liquid/liquid extraction. In a still alternative embodiment, membranes 11 and 71 can each have a selectivity towards different reaction products, and hence be used for separately removing different reaction products from a feed stream.

Yet additional fluid compartments 725 can be provided, such as between the compartments 124 and 724. Fluid compartments 725 can e.g. be used for circulating a cooling or heating fluid through the support 72. This can be used when it is desirable to control the temperature of the feed stream in which the cartridge is immersed, or the temperature of the permeate. This is particularly suitable when no air bubbling is effected, e.g. when no aeration compartment 125 is provided. To this end, the fluid compartments 725, which are sealed from the other fluid compartments 124 and 724, and possibly 125, can be fluidly connected to a separate duct in either one or both manifolds 13 and 14.

Figure 8:
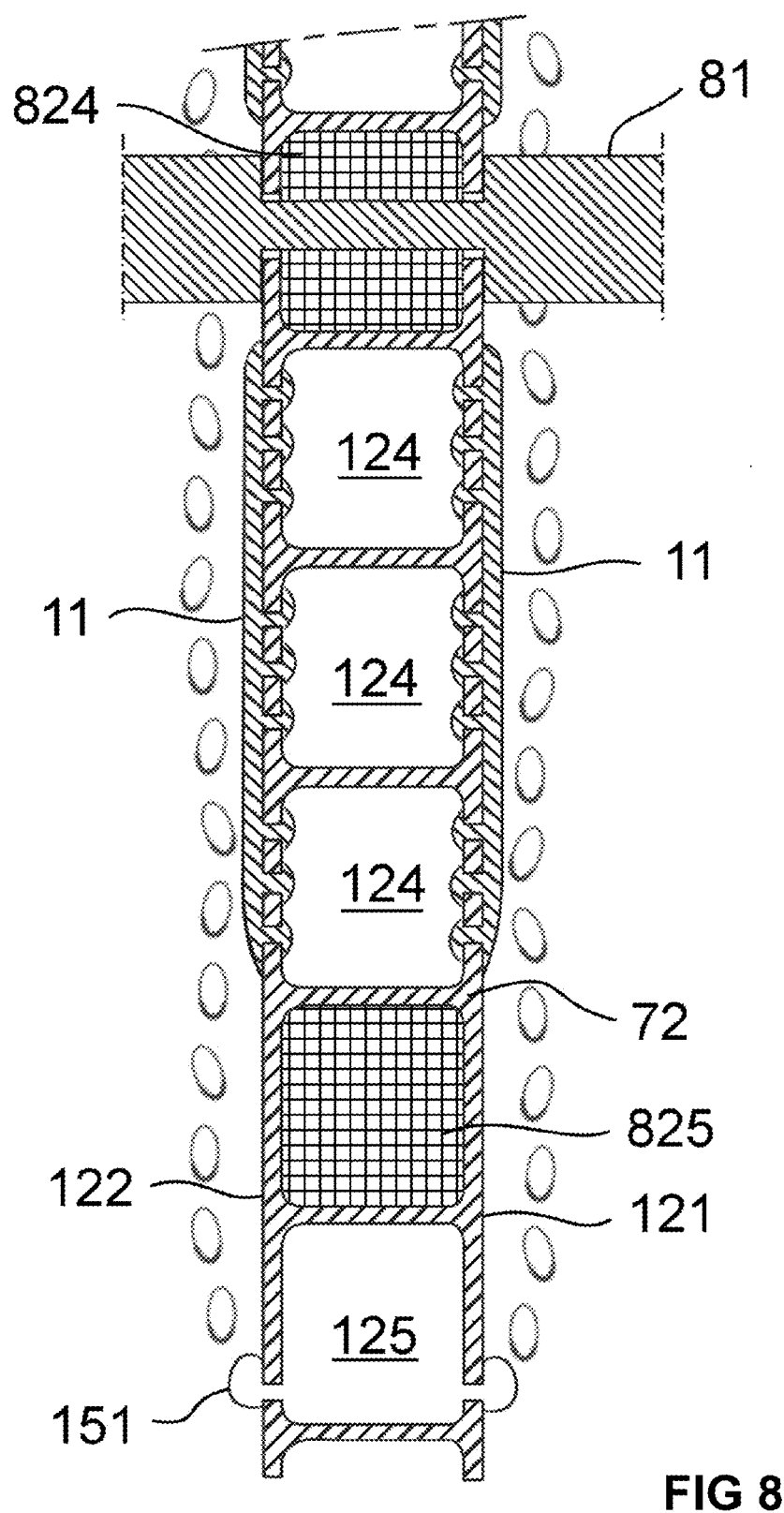
FIG. 8 represents a partial cross sectional view of the support of FIG. 7 used in another embodiment of the invention.

The shape of spacing members 123 forming web members which divide the internal volume of the support in separate compartments has additional advantages. Referring to FIG. 8, some compartments 825 can be used for inserting a reinforcing bar through them. Other compartments 824 can be sacrificed for having them crossed by a spacer bar 81 arranged perpendicular to the first surface 121. Spacer bar 81 keeps the cartridges in the stack spaced apart. Compartment 824 can be filled or sealed with a solid material to prevent leakage of the feed into permeate collector duct 133.

Figure 9:
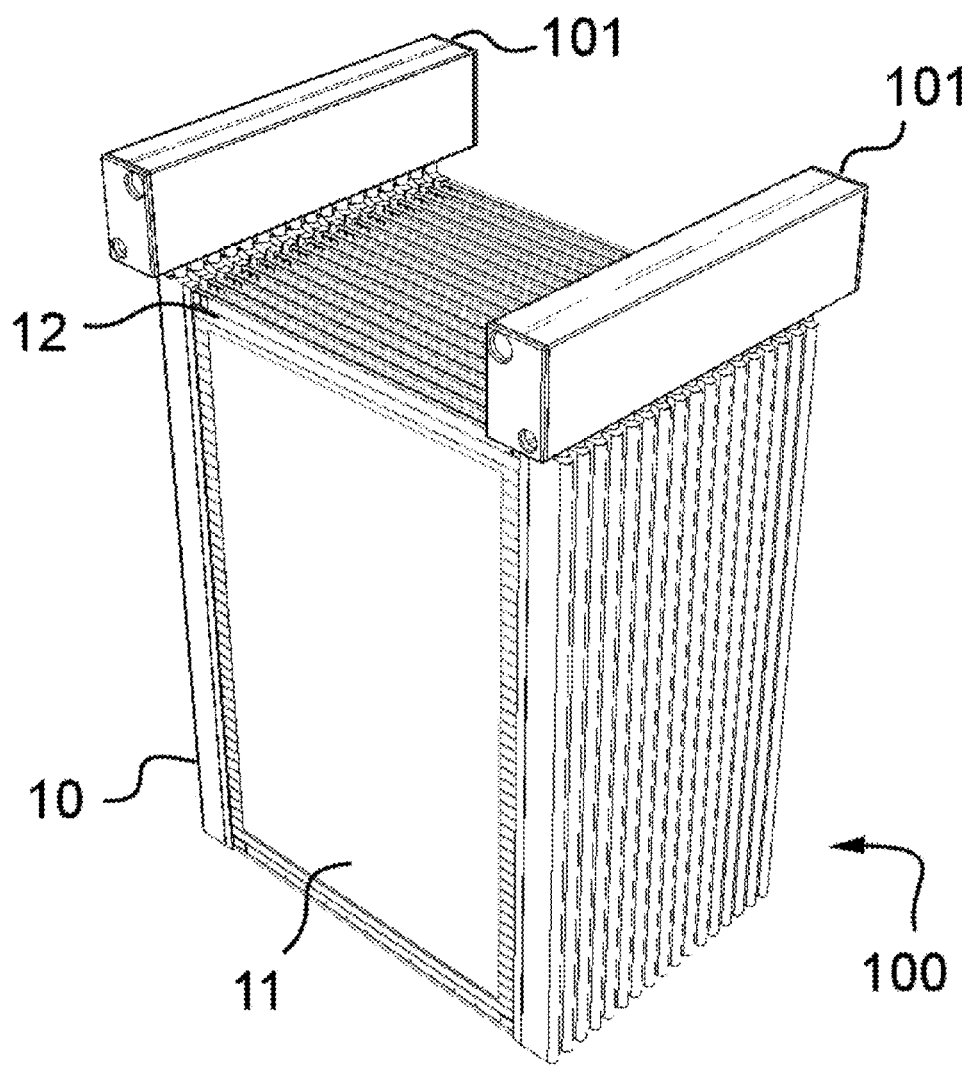
FIG. 9 represents a perspective view of a filtration module, comprising a stack of filtration cartridges of FIG. 1 and stack manifolds.

Filtration cartridges 10 can be stacked by placing the first surface 121 of one cartridge and the second surface 122 of a consecutive cartridge in a facing relationship and spaced apart from one another. A stack 100 is so obtained as shown in FIG. 9. The manifolds of consecutive cartridges in stack 100 may or may not be spaced from one another. A spacing between consecutive manifolds is not required, since the integrated air diffuser (holes 15) will entail an upward fluid flow between opposite membranes 11 of consecutive cartridges 10. This can be advantageous, since the manifolds can be made appropriately thicker than the supports of the cartridges to define the spacing between the membrane layers (the spacing between opposite membrane layers of the stack corresponds in such a case to the thickness difference between the manifold on the one hand and the support plus membrane layers on the other).

Figure 10:
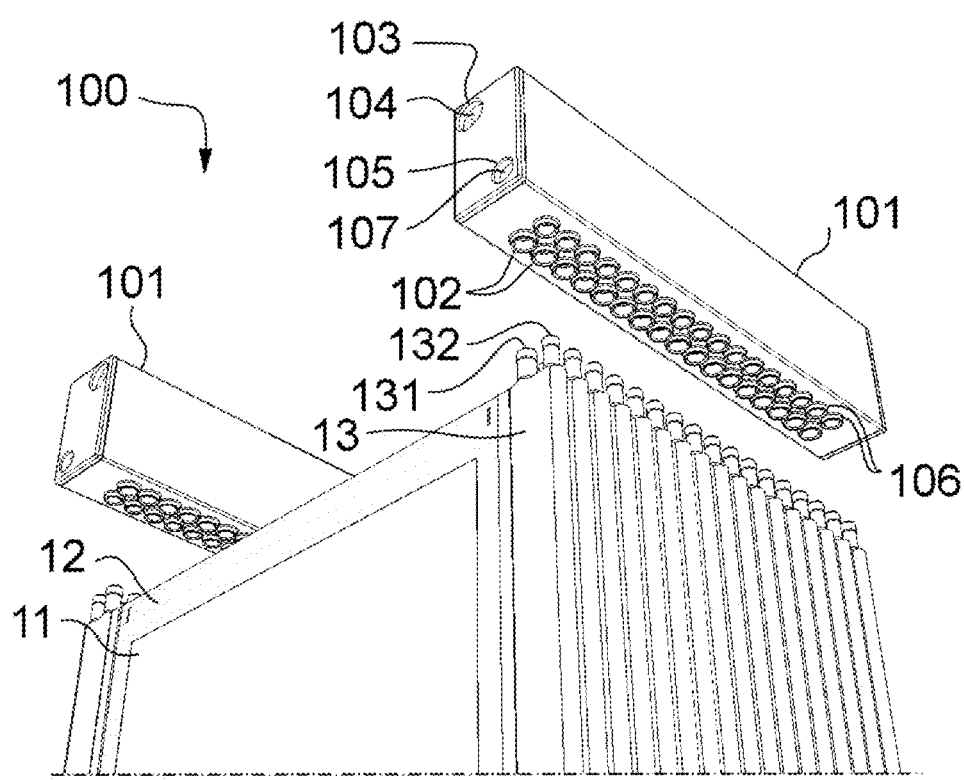
FIG. 10 represents an exploded partial view of the module of FIG. 9.

A stack collection and distribution manifold 101 can be coupled to the inlet and outlet ports 131, 132, 141, 142 at opposite sides of the stack 100 to form a filtration module. The stack manifold is more clearly seen in FIG. 10. It comprises separate chambers for the separate ducts of the corresponding manifolds 13. Stack manifold 101 can comprise a permeate collection and evacuation chamber 104 having inlet ports 102 configured to be connected to outlet ports 131 of the manifolds 13. The permeate collection chamber is further provided with an outlet port 103. Stack manifold 101 can comprise an air distribution chamber 107 separated from chamber 104 by a fluid impermeable wall (not shown), and having an inlet port 105 and outlet ports 106 which are configured to be connected to the inlet ports 132 of the manifolds 13. A same stack manifold can be provided for connection to the ports 141, 142 of manifold 14.

Advantageously, the outlet port 103 of the permeate collection chamber 104 is arranged in a top region of the permeate collection chamber 104 to ensure de-gassing of the permeate circuit. Such gas can be formed from air or carbon dioxide which was originally dissolved in the permeate liquid.

Advantageously, stack manifold 101 and the manifolds 13 can be integrally formed as a monobloc manifold (not shown). Hence, all the manifolds 13 of cartridges 10 of stack 100 are replaced by one monolithic or monobloc manifold. The monobloc manifold can have separate fluid ducts or chambers for the separate fluid compartments of the cartridges' supports. The monobloc manifold advantageously comprises connectors for detachable connection of each of the cartridges (supports), such that when one cartridge fails, it can be easily replaced. With such monobloc manifolds, the cartridges may or may not comprise individual manifolds 14 at the opposite side. The manifolds 14 may be replaced by a monobloc manifold as well. The flow constrictions imposed by permeate evacuation ports 131 and 141 (due to thickness limitation of the manifold and the cartridge) are avoided with a monobloc manifold, which hence allows for increasing the flow rate of permeate evacuated from the cartridges and/or for avoiding excessive pressure losses due to those flow constrictions. Such a monobloc manifold can be injection moulded on the stack of membrane panels 11-12, e.g. by stacking the membrane panels first and overmoulding the manifold on the side edge of the stack of panels.

It will be convenient to note that, even though in the above examples the cartridges have been described as being provided with a membrane layer at both front and back faces, this is not a requirement. Cartridges according to the invention can work with a membrane layer attached to one surface (e.g. front face) of the support only.

It will also be convenient to note that the membrane layers 11, 71, etc. can be formed on the support either before attaching the manifolds 13, 14 to the support 12, or thereafter.

In the above, example cartridges have been described comprising a rigid multi-walled panel as support. Even though such a support may provide for advantages as stated, aspects of the invention, as broadly formulated in the claims, are not limited to such supports alone. The support may well be a spacer fabric with a membrane layer coated on the outer fabric layers, as described in WO 2006/015461. In such a case the permeate collection compartment is formed as one single compartment, possibly extending over the entire membrane area.

Figure 11:
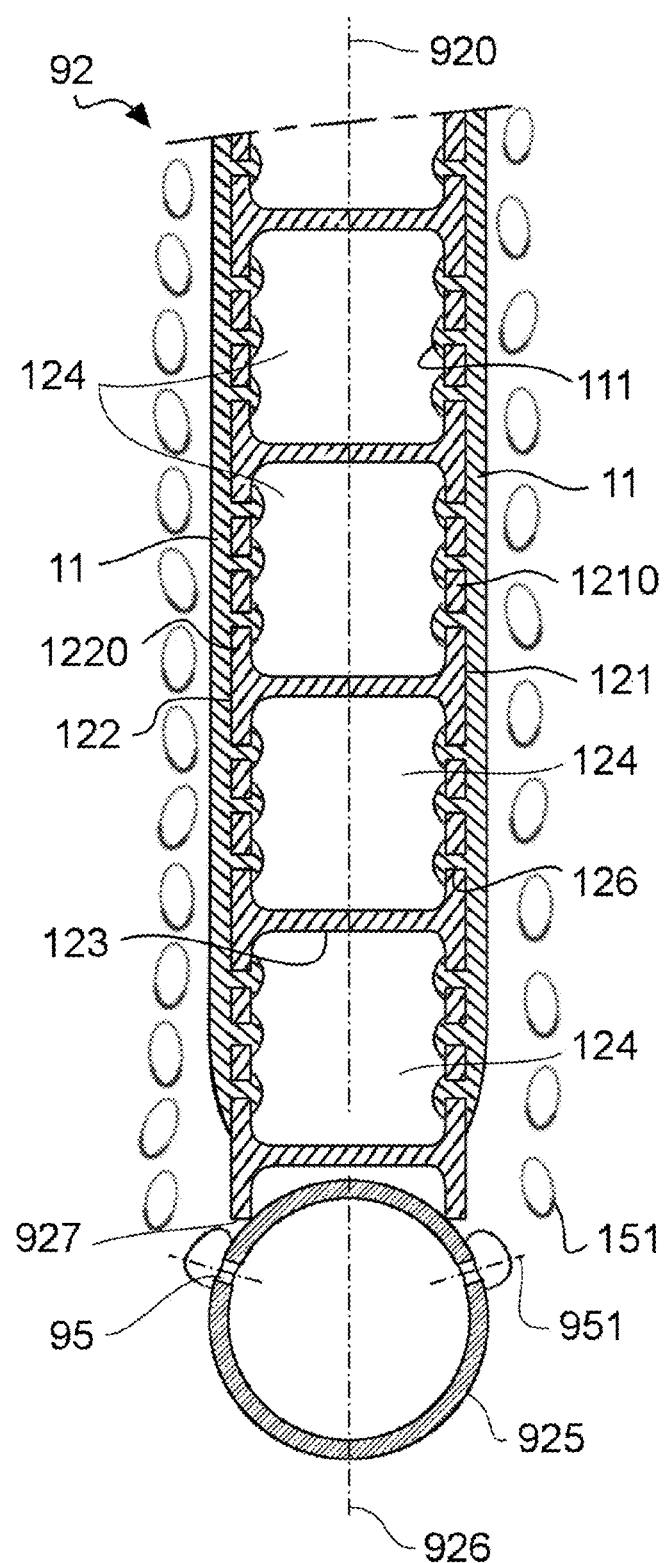
FIG. 11 represents a partial cross sectional view of a support and attached second compartment according to another embodiment of the invention.

Furthermore, the second fluid compartment, e.g. for air bubbling, need not be fully interposed between the outer surfaces of the support, and can be externally attached to the support, e.g. as a tube. Such a configuration is shown in FIG. 11, which comprises a support 92 which differs from support 12 of the previous examples in that no second compartment 125 is integrally interposed between the outer surfaces 121 and 122. Instead, a tube 925 is attached underneath the support 92, such that the support 92 and the tube 925 are aligned along a vertical line. To this end, a (vertical) median plane 926 of tube 925 is coincident (coplanar) with a (vertical) median plane 920 of the support 92. Tube 925 advantageously acts as the second compartment, separate from the first compartments 124 and may be supplied by a separate duct 134 (not shown in FIG. 11) as with the previous examples. The second compartment 925 may have a thickness (e.g. diameter) which is larger or smaller than the thickness of the support 92.

Aeration holes 95 are formed through a wall of tube 925. These holes 95 may have centreline axes 951 which are at a nonzero angle with the median plane 926. Axes 951 may be oriented inclined (not zero and not 90 degrees) or perpendicular to the median plane 926.

EXPERIMENTS

Experiments have been performed for verifying the effects of aspects of the invention in submerged membrane bioreactor (MBR) applications. Three different cartridges (numbered #1-#3) were used, each being double sidedly provided with PVDF membrane layers. The membrane area at each side was about 15 cm wide and 25 cm in height, with a total effective membrane (filtration) area of 0.07 $m^2$/cartridge. All PVDF membrane layers had a surface pore size of 0.08 µm and a clean water permeability of 1500 l/$hm^2$ bar.

Cartridges #1-#2 were made starting from a multi-walled rigid support panel as shown in FIGS. 2-3. A multiwall polycarbonate panel Makrolon® multi UV 2/4-6 (Bayer, Germany) was used as the membrane support material. The "2" in the reference code of this material refers to its two outer walls; the "4" to its total thickness of 4 mm and the "6" to the rib distance of 6 mm. This panel was perforated by high speed microdrilling. In the walls of the support of cartridge #1 holes of 0.8 mm diameter were drilled, to obtain an open area (porosity) underneath the membrane layers of 31.6%. In the walls of the support of cartridge #2, the holes had a diameter of 1.5 mm and the open area was 20.5%. The PVDF membrane layers were directly coated on the perforated walls as described in WO 2013/113928.

In order to test the integrated and individual aeration, an aeration compartment 125 was provided two channels underneath the bottom edge of the membrane area. The aeration compartment was provided with twelve holes of 0.5 mm diameter at an interdistance of 15 mm at each side.

The third cartridge (#3) had a woven type of polyester spacer fabric as support onto which a PVDF membrane layer was coated double sided. The total resulting thickness (including membrane layers) was 4 mm. The panel containing the PVDF membranes was framed between two polyester frames (following WO 2006/015461) and an aeration tube 925 was attached underneath the frame. This tube also contained twelve holes with 0.5 mm diameter at an interdistance of 15 mm at each side.

Figure 12:
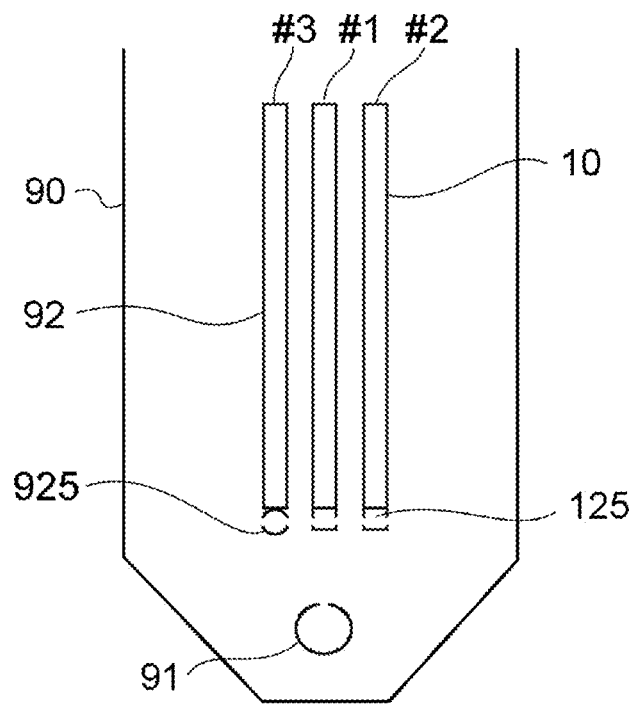
FIG. 12 represents an experimental setup used for performing the comparative experiments described herein.

These three cartridges have been tested in parallel in a lab-scale MBR unit at Vito, Belgium. FIG. 12 schematically represents the extraction tank 90 of the MBR unit used for the experiments. The extraction tank allows to operate multiple (up to 6) filtration cartridges 10 at the same time in the same sludge, under different as well as completely equal filtration conditions since each cartridge has its own extraction/backwash pump, permeate reservoir, flow meter and pressure transducer. The tank 90 also comprises a central aeration tube 91 at the bottom of the reservoir. This is a single perforated plastic tube placed in parallel with the plane of the three cartridges, 20 cm underneath the bottom of the cartridges, exactly in the middle. The tube 91 had an inner/outer diameter of respectively 8/10 mm and contained an array of 100 holes with a diameter of 1 mm and over a length of 25 cm. The tank 90 allows operation with the central aeration tube 91 and with the individual aeration compartments 125, 925 independently, e.g. central aeration tube 91 can be closed off or the compartments 125, 925 can be closed off.

The MBR extraction tank 90 was provided with the three cartridges #1-#3 at a spacing between the cartridges of 5 mm. The volume of sludge contained in tank 90 was 80 liters. Fresh waste municipal waste water (COD: 400-600 ppm) is first collected into a 400-liter reservoir (not shown), where the waste water is cooled down to 4° C. to avoid biological growth and COD breakdown already in the feed tank. 50% of the permeate extracted from the cartridges was recycled into the extraction tank 90. The liquid level in the extraction tank 90 of the MBR was kept constant by feeding with a mixture of fresh waste water from the 400 liter reservoir compensating the non-recycled volume of permeate extracted by the three cartridges. The MBR unit has a pH control unit for compensating the acidification as a result of nitrification. Diluted KOH solution (1 molar) was used to bring the pH again to about 7. The COD of the permeate of the cartridges was always between 10 and 20 mg/l resulting in a mean COD removal of 97%.

First Experiment—Individual Aeration

In a first experiment, the three cartridges were tested for individual aeration. The cartridges #1-#3 were completely submerged in sludge in the tank 90. Through the aeration compartments 125, 925 of each cartridge, an air flow of 0.7 Nm$^3$/h was blown, while the central tube 91 was not used (closed off). The filtration conditions for the three filtration cartridges were identical during the test and were as follows:

| | |
|---|---|
| Gross filtration flux per cartridge: | 50 l/hm$^2$ |
| Net filtration flux per cartridge: | 40 l/hm$^2$ |
| Backwash flux per cartridge: | 150 l/hm$^2$ (three times the gross filtration flux) |
| Filtration cycle time: | 5 min |
| Filtration time: | 4.5 min |
| Backwash time: | 10 sec |
| Relaxation time: | 20 sec |
| Continuous aeration flow per cartridge: | 0.7 Nm$^3$ air/hour |
| Sludge concentration during the test: | 10 g/l |
| pH variation during the test: | between 6.8 and 7.2 |
| Temperature: | 14-15° C. |

The filtration cycle time is the sum of filtration time, backwash time and relaxation time. After 4.5 min of filtration operation, a backwash operation was started during 10 s at the indicated backwash flux. After backwashing, a relaxation was applied during 20 s in order to allow the cake layer removed during backwashing to be transported away from the cartridges into the bulk of the sludge by the rising air bubbles.

Figure 13:
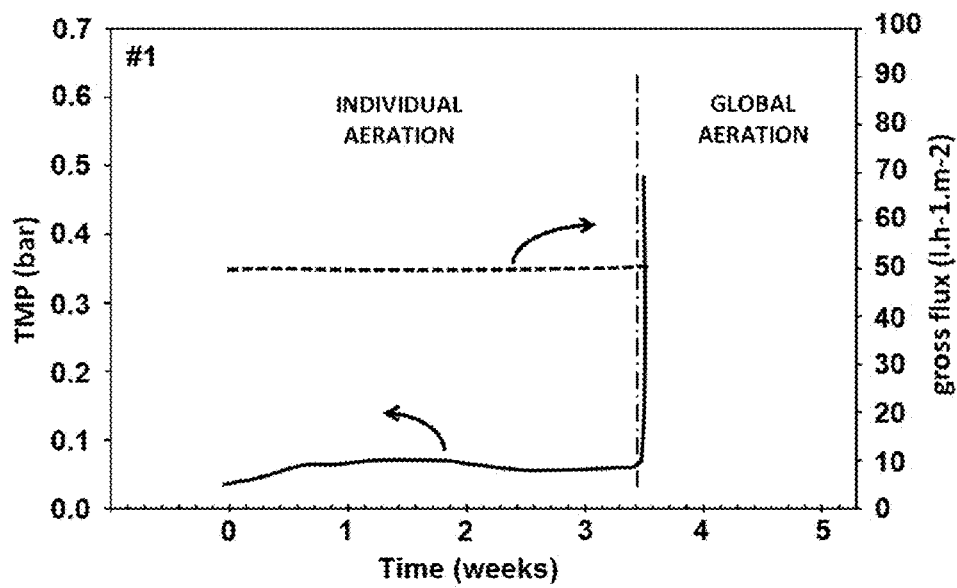
FIGS. 13 to 15 represent graphs of experimental results of the operational performance of cartridges (indicated #1-#3) according to aspects of the invention when used for filtration and aeration in a membrane bioreactor test set up. Each graph shows results for two consecutive experiments, separated by the dashed dotted line and wherein the evolution of the gross flux (dashed line, right scale) and the transmembrane pressure (TMP, solid line, left scale) are set out versus time.
Figure 14:
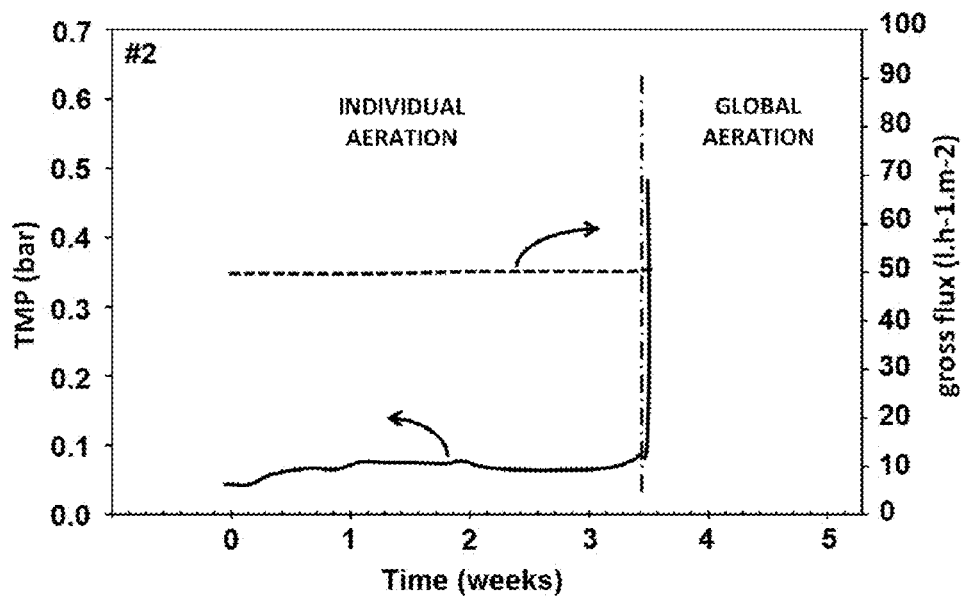
Figure 15:
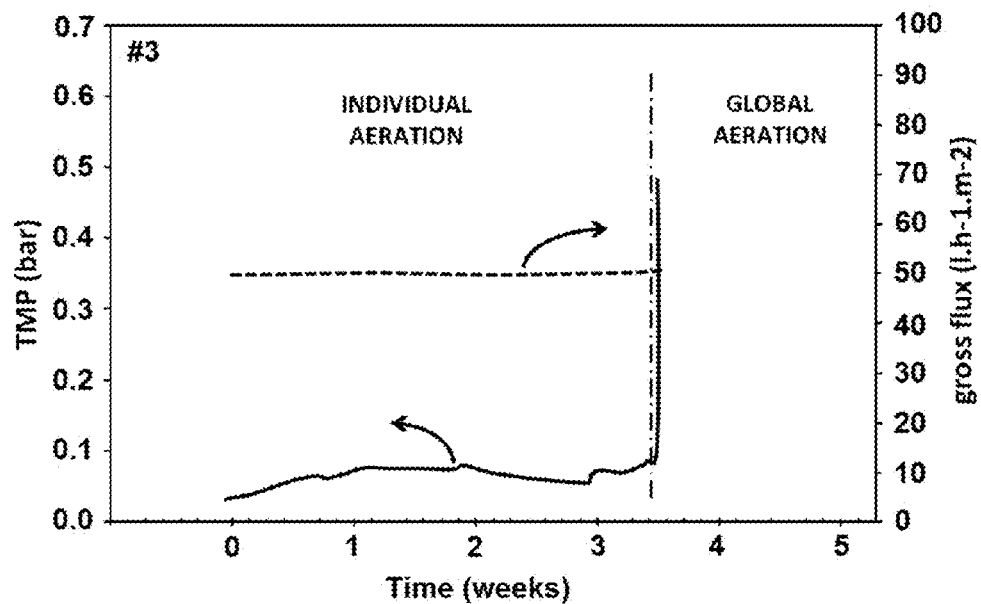

The first experiment was run during 3.5 weeks with a stable transmembrane pressure (TMP) smaller than 0.1 bar at a gross flux of 50 l/hm$^2$, which shows the reliability of individual cartridge aeration. The evolution of TMP and gross flux as a function of time is shown in the graphs of FIGS. 13-15, for cartridges #1-#3 respectively.

Second Experiment—Global Aeration

In a second, comparative experiment, central (common) aeration through tube 91 was tested. Immediately following the above three and a half weeks of individual aeration, the air flow through the aeration compartments 125, 925 was stopped, and an airflow equal to the sum of the air flow rates through compartments 125, 925 in the first experiment (2.1 Nm$^3$/h) was blown through the central aeration tube 91. This experiment is referred to as "Global aeration" in FIGS. 13-15. A same filtration cycle as in the first experiment was used, and a same gross flux of 50 l/hm$^2$ was maintained for each cartridge. The filtration conditions in the second experiment were identical to those of the first experiment.

In this second experiment, it was observed that the TMP required to maintain the gross flux of 50 l/hm$^2$ rapidly increased for all three cartridges. A TMP increased to 0.5 bar after 60 minutes for cartridge #1, after 120 minutes for cartridge #2 and after 55 minutes for cartridge #3. The cartridge operation was stopped when the TMP arrived at 0.5 bar, since such a high value is not economical any more.

The clear difference between the two aeration modes is shown in the graphs of FIGS. 13-15. On the left hand side of the dash-dotted line in each graph, the results of the first experiment are set out ("individual aeration"), whereas the results of the second experiment are set out on the right hand side ("global aeration").

Comparison between the first and second experiments shows that under global aeration, the high permeate fluxes which are possible with individual aeration cannot be sustained. In order to operate the cartridges under global aeration, either the air flow rate blown through the central tube needs to be increased (i.e. this mode of operation requires a higher specific aeration demand (SAD), which increases operational costs), or the permeate flux must be reduced (reducing the output). It is therefore shown that integrating a separate fluid compartment in the cartridge as proposed in the present invention, and using it for individual aeration of the membrane layers enables to significantly increase MBR performance.

Assembly for treating fluids, comprising a support (12) having a first and second oppositely arranged surfaces (121) for backing support of a semi permeable membrane (11), a first fluid conveying compartments (124) interposed between the first and second surfaces, a plurality of first fluid passages (126) extending from the first surface (121) and being in fluid communication with the first compartments (124), and a first duct attached to the support (12) and in fluid communication with the first compartments. The assembly comprises a second compartment (125) arranged for conveying fluid and different from the first compartment, and a second duct attached to the support (12) and configured to be in fluid communication with the second compartment (125). The second compartment is located according to (i) interposed between the first and second surfaces, or (ii) attached or attachable to a first edge (127) of the support such that a median plane of the second compartment is coincident with a median plane of the support. The second duct is fluid tightly sealed from the first compartment, and the first duct is fluid tightly sealed from the second compartment.

The present disclosure may include one or more of the following concepts:

A. Assembly for treating fluids, comprising:
a support (12, 72) having a first planar surface (121) arranged for backing support of a semi permeable membrane (11, 71) and a second surface (122), the first and second surfaces being arranged oppositely one another,
at least one first compartment (124) interposed between the first and second surfaces, the first compartment being arranged for conveying fluid, a plurality of first fluid passages (126) extending from the first surface (121) and being in fluid communication with the at least one first compartment (124), a first duct (133) attached or attachable to the support (12, 72) and configured to be in fluid communication with the at least one first compartment (124), at least one second compartment (125, 725, 925) being arranged for conveying fluid and being separate from the at least one first compartment, and a second duct (134) attached or attachable to the support (12, 72) and configured to be in fluid communication with the second compartment (125, 724, 725, 925), wherein the second compartment is located according to one of a group consisting of:

interposed between the first and second surfaces, and attached or attachable to a first edge (127) of the support such that a median plane of the second compartment is coincident with a median plane of the support, wherein the second duct (134) is fluid tightly sealed from the at least one first compartment, and the first duct (133) is fluid tightly sealed from the at least one second compartment.

B. Assembly in accordance with paragraph A, wherein the first duct (133) and the second duct (134) are parallel to each other.

C. Assembly in accordance with paragraphs A or B, wherein the second duct (134) extends parallel to a second edge (128, 129) of the support.

D. Assembly in accordance with paragraph C, wherein the second edge (128, 129) is a vertical edge of the support (12).

E. Assembly in accordance with paragraphs C or D, wherein the second edge (128, 129) is perpendicular to the first edge (127).

F. Assembly in accordance with any of the previous paragraphs, wherein the at least one first compartment (124) and the at least one second compartment (125) extend parallel to one another.

G. Assembly in accordance with any of the previous paragraphs, wherein the at least one first compartment (125) extends parallel to the first edge (127) of the support.

H. Assembly in accordance with paragraph G, wherein the first duct (133) and the second duct (134) are parallel to each other and extend parallel to a second edge (128, 129) of the support, the second edge being perpendicular to the first edge (127).

I. Assembly in accordance with any of the previous paragraphs, wherein the support (12, 72) comprises at least one fluid tight web member (123) extending between the first (121) and second (122) surfaces, the fluid tight web member forming a separating wall between the at least one first compartment (124) and the at least one second compartment (125).

J. Assembly in accordance with any of the previous paragraphs, wherein the support (12, 72) extends between opposite side edges (128, 129), and wherein each of the first duct (133) and the second duct (134) extends along at least one of the opposite side edges (129), wherein the first duct (133) comprises a slit (137) arranged along the duct, wherein the slit sealingly receives one of the opposite side edges (128, 129) of the support.

K. Assembly in accordance with any of the previous paragraphs, wherein the first fluid passages (126) are located on a membrane area of the first surface (121), which area is configured for being covered by a semi-permeable membrane (11), and wherein the first duct (133) and the second duct (134) are parallel and arranged adjacent the membrane area when considered from a view perpendicular to the first surface (121).

L. Assembly in accordance with any of the previous paragraphs, wherein the second compartment (125, 725) is interposed between the first and second surfaces, wherein the support (12, 72) is rigid and extends between opposite side edges (128, 129) and comprises a plurality of web members (123) interposed between the first and second surfaces (121, 122), the web members extending between the opposite side edges (128, 129), wherein the web members fluid tightly separate the first compartment (124) and the second compartment (125, 725) from one another.

M. Assembly in accordance with any of the previous paragraphs, wherein the second compartment (125, 724) is delimited by a wall (1210, 1220) comprising apertures (15) fluidly communicating with an external side of at least one of the first and second surfaces (121, 122).

N. Assembly in accordance with paragraph M, wherein the apertures (15) have aperture axes perpendicular to a plane of the aperture.

O. Assembly in accordance with paragraph N, wherein the aperture axes are oriented nonparallel to the first surface (121).

P. Assembly in accordance with paragraph N, wherein the aperture axes are substantially perpendicular to the first surface (121).

Q. Assembly in accordance with paragraphs M to P, wherein the wall (1210, 1220) delimiting the second compartment comprises a portion parallel to the first surface.

R. Assembly in accordance with paragraphs M to Q, wherein the apertures are positioned along a horizontal line.

S. Assembly in accordance with paragraphs M to R, wherein the second compartment (125, 725) is interposed between the first and second surfaces, wherein the first fluid passages (126) are located on a membrane area of the first surface (121), which area is configured for being covered by a semi-permeable membrane (11), wherein the apertures (15) extend between the second compartment (125) and the first surface (121), wherein the apertures are located in a second area of the first surface (121) separate from the membrane area.

T. Assembly in accordance with paragraph S, wherein the second area is located below the membrane area.

U. Assembly in accordance with any of the previous paragraphs, wherein the second surface is planar, wherein the assembly comprises a plurality of second fluid passages (126) extending from the second surface (122) and being in fluid communication with the at least one first compartment (124).

V. Assembly (10) in accordance with any of the previous paragraphs, comprising a first semi-permeable membrane (11, 71) attached to the first surface (121) and covering a membrane area of the first surface enclosing the first fluid passages (126), wherein the at least one first compartment (124) is in fluid communication with the first membrane through the first fluid passages (126).

W. Assembly in accordance with paragraph V, wherein the first semi-permeable membrane (11) is spaced apart from at least one edge (120, 127, 128, 129) of the first surface (122).

X. Assembly in accordance with paragraphs V or W, comprising a second semi-permeable membrane (11, 71) attached to the second surface (122), wherein the second surface is planar, wherein the assembly comprises a plurality of second fluid passages (126) extending from the second surface (122) and being in fluid communication with the at least one first compartment (124), wherein the first compartment (124) is in fluid communication with the second membrane through the second fluid passages (126).

Y. Assembly in accordance with paragraphs V to X, comprising a third semi-permeable membrane (71) having permeability characteristics different from the first membrane (11), wherein the third membrane is attached to the first surface (121) on an area separate from the membrane area, wherein the third membrane is in fluid communication with the second compartment (724).

Z. Module for treating fluids, comprising a plurality of assemblies (10) in accordance with paragraphs T to W arranged in a stack (100), a collector (104) in fluid communication with the first ducts (133) and a distribution manifold (107) in fluid communication with the second ducts (134).

AA. Module in accordance with paragraph Z, wherein the distribution manifold (107) is configured for conveying a gas, wherein the assemblies (10) comprise apertures (15) in fluid communication with the second compartment (125, 724) and with ambient environment surrounding the assembly.

BB. Module in accordance with paragraphs Z or AA, comprising a monolithic manifold in which the first ducts of the assemblies are integrated.

CC. A biomass reactor, comprising the module in accordance with paragraphs Z to BB.

The invention claimed is:
1. An assembly for treating fluids, comprising:
   a support having a first planar surface arranged for backing support of a semi permeable membrane and a second surface, the first and second surfaces being arranged oppositely one another,
   at least one first compartment interposed between the first and second surfaces, the at least one first compartment being arranged for conveying fluid,
   a plurality of first fluid passages extending from the first surface and being in fluid communication with the at least one first compartment,
   a first semi-permeable membrane attached to the first surface and covering a membrane area of the first surface enclosing the first fluid passages, wherein the at least one first compartment is in fluid communication with the first membrane through the first fluid passages,
   a first duct attached or attachable to the support and configured to be in fluid communication with the at least one first compartment,
   at least one second compartment being arranged for conveying fluid and being separate from the at least one first compartment, and
   a second duct attached or attachable to the support and configured to be in fluid communication with the at least one second compartment,
   wherein the at least one second compartment is interposed between the first and second surfaces, the second duct is fluid tightly sealed from the at least one first compartment, and the first duct is fluid tightly sealed from the at least one second compartment, and
   wherein the at least one second compartment is delimited by a wall comprising apertures fluidly communicating with an external side of at least one of the first and second surfaces.

2. The assembly of claim 1, wherein the first duct and the second duct are parallel to each other.

3. The assembly of claim 1, wherein the support comprises a first edge, the second duct extends parallel to a second edge of the support, and the second edge is perpendicular to the first edge.

4. The assembly of claim 3, wherein the second edge is a vertical edge of the support.

5. The assembly of claim 1, wherein the at least one first compartment and the at least one second compartment extend parallel to one another.

6. The assembly of claim 1, wherein the at least one first compartment extends parallel to a first edge of the support, and wherein the first duct and the second duct are parallel to each other and extend parallel to a second edge of the support, the second edge being perpendicular to the first edge.

7. The assembly of claim 1, wherein the support comprises at least one fluid tight web member extending between the first and second surfaces, the fluid tight web member forming a separating wall between the at least one first compartment and the at least one second compartment.

8. The assembly of claim 1, wherein the support extends between opposite side edges, each of the first duct and the second duct extends along at least one of the opposite side edges, the first duct comprises a slit arranged along the first duct, and the slit sealingly receives one of the opposite side edges of the support.

9. The assembly of claim 1, wherein the first duct and the second duct are parallel and arranged adjacent the membrane area when considered from a view perpendicular to the first surface.

10. The assembly of claim 1, wherein the support is rigid and extends between opposite side edges and comprises a plurality of web members interposed between the first and second surfaces, the web members extending between the opposite side edges, and wherein the web members fluid tightly separate the at least one first compartment and the at least one second compartment from one another.

11. The assembly of claim 1, wherein the apertures have aperture axes perpendicular to a plane of the aperture, and the aperture axes are oriented nonparallel to the first surface.

12. The assembly of claim 1, wherein the apertures are positioned along a horizontal line, the apertures extend between the at least one second compartment and the first surface, and the apertures are located in a second area of the first surface separate from the membrane area.

13. The assembly of claim 12, wherein the second area is located below the membrane area.

14. The assembly of claim 1, comprising a second semi-permeable membrane attached to the second surface, wherein the second surface is planar, the assembly comprises a plurality of second fluid passages extending from the second surface and being in fluid communication with the at least one first compartment, and the at least one first compartment is in fluid communication with the second membrane through the second fluid passages.

15. The assembly of claim 1, comprising a third semi-permeable membrane having permeability characteristics different from the first membrane, wherein the third membrane is attached to the first surface on an area separate from the membrane area, and the third membrane is in fluid communication with the at least one second compartment.

16. A module for treating fluids, comprising a plurality of assemblies of claim 1 arranged in a stack, a collector in fluid communication with the first ducts and a distribution manifold in fluid communication with the second ducts.

17. The module of claim 16, wherein the distribution manifold is configured for conveying a gas, and the assemblies comprise apertures in fluid communication with the at least one second compartment and with ambient environment surrounding the assembly.

18. The module of claim 16, comprising a monolithic manifold in which the first ducts of the assemblies are integrated.

19. A biomass reactor, comprising the module of claim 16.

* * * * *